US012106725B2

(12) United States Patent
Ishii et al.

(10) Patent No.: US 12,106,725 B2
(45) Date of Patent: Oct. 1, 2024

(54) CONTROL DEVICE, DISPLAY APPARATUS, AND CONTROL METHOD

(71) Applicant: JOLED INC., Tokyo (JP)

(72) Inventors: Hiroaki Ishii, Tokyo (JP); Toshiyuki Kato, Tokyo (JP)

(73) Assignee: JDI DESIGN AND DEVELOPMENT G.K., Tokyo (JP)

( * ) Notice: Subject to any disclaimer, the term of this patent is extended or adjusted under 35 U.S.C. 154(b) by 0 days.

(21) Appl. No.: 17/959,756

(22) Filed: Oct. 4, 2022

(65) Prior Publication Data

US 2023/0110329 A1 Apr. 13, 2023

(30) Foreign Application Priority Data

Oct. 8, 2021 (JP) ................................ 2021-166313

(51) Int. Cl.

| | |
|---|---|
| ***G09G 3/3233*** | (2016.01) |
| ***G09G 3/20*** | (2006.01) |
| ***G09G 3/3258*** | (2016.01) |
| ***G09G 3/34*** | (2006.01) |

(52) U.S. Cl.

CPC ......... *G09G 3/3413* (2013.01); *G09G 3/2018* (2013.01); *G09G 3/3233* (2013.01); *G09G 3/3258* (2013.01); *G09G 2300/0861* (2013.01); *G09G 2310/0286* (2013.01); *G09G 2310/08* (2013.01); *G09G 2320/0247* (2013.01)

(58) Field of Classification Search

CPC ......... G09G 3/3233; G09G 2300/0861; G09G 3/2022; G09G 3/2018; G09G 2310/08; G09G 2310/0286; G09G 3/3413; G09G 3/2927; G09G 3/2062; G09G 3/3266; G09G 2320/045; G09G 3/3258; G09G 2320/0626; G09G 2360/16; G09G 2320/0646; G09G 2320/0233; G09G 3/2942; G09G 2320/0247

See application file for complete search history.

(56) References Cited

U.S. PATENT DOCUMENTS

| | | | | |
|---|---|---|---|---|
| 10,425,623 | B2 * | 9/2019 | Ishii | H04N 5/04 |
| 10,574,946 | B2 | 2/2020 | Ishii | |
| 11,151,919 | B2 * | 10/2021 | Yoon | G09G 3/20 |

(Continued)

FOREIGN PATENT DOCUMENTS

| | | |
|---|---|---|
| JP | 2018-205457 | 12/2018 |
| JP | 2019-015794 | 1/2019 |

*Primary Examiner* — Dismery Mercedes

(74) *Attorney, Agent, or Firm* — Greenblum & Bernstein, P.L.C.

(57) ABSTRACT

A control device for a display panel for applications where a frame period in which a same image continues to be displayed varies from frame to frame within a certain range or the frame period is temporarily stable across frames and where a precise frame period is undetermined beforehand. The control device controls the display panel such that, when a frame having a length exceeding a preset number of lines is input, the display panel displays an image over a frame period corresponding to the preset number of lines and an added period added after the frame period. The added period includes one or more individual added periods each including a light emission period and a light extinction period, and the one or more individual added periods are each a period corresponding a predetermined number of lines.

15 Claims, 13 Drawing Sheets

(56) References Cited

U.S. PATENT DOCUMENTS

| | | | | |
|---|---|---|---|---|
| 2007/0126757 | A1* | 6/2007 | Itoh | G09G 3/342<br>345/690 |
| 2012/0249617 | A1* | 10/2012 | Ikawa | H04N 21/44008<br>345/691 |
| 2014/0307009 | A1* | 10/2014 | Hasegawa | G09G 5/10<br>345/76 |
| 2017/0004766 | A1* | 1/2017 | Cho | G06F 1/1652 |
| 2018/0350304 | A1* | 12/2018 | Ishii | G09G 3/2022 |
| 2019/0014292 | A1* | 1/2019 | Ishii | H10K 59/131 |

* cited by examiner

CONTROL DEVICE, DISPLAY APPARATUS, AND CONTROL METHOD

CROSS REFERENCE TO RELATED APPLICATION

The present application is based on and claims priority of Japanese Patent Application No. 2021-166313 filed on Oct. 8, 2021. The entire disclosure of the above-identified application, including the specification, drawings and claims is incorporated herein by reference in its entirety.

FIELD

The present disclosure relates to a control device, a display apparatus, and a control method and relates, in particular, to a control device, a display apparatus, and a control method for controlling the display luminance of a display.

BACKGROUND

Conventionally, techniques for keeping flicker from being visually recognized in display apparatuses are contemplated. For example, according to one contemplated technique, the number of subframes constituting one frame period is changed in accordance with the duty cycle set based on luminance information, and the duty cycle of each subframe is set to a duty cycle equal to the duty cycle of one frame period. With such a technique, flicker that may appear on a display screen can be suppressed even in a case where a light emission period has been changed to adjust, for example, the luminance.

In recent years, video images are drawn on displays of personal computers, mobile devices, or the like increasingly by a video processing device called a graphics processing unit (GPU). Then, the display speed of a display is increasingly determined by the performance of the GPU. In other words, in recent years, the frame period (the frame rate) varies depending on the contents of the process performed by the GPU.

Accordingly, Patent Literatures (PTLs) 1 and 2 each disclose a control device and so on that can suppress an occurrence of flicker even when the frame period varies. For example, according to the technique disclosed in PTL 1, the length of a light extinction period to be held when an extension period has been provided is controlled based on the ratio between the number of vertical lines indicating a frame period of a current frame and a minimum number of vertical lines set in advance and such that the ratio between the length of a light emission period and the length of a light extinction period stays constant in the frame period held when a video image with the number of vertical lines of the current frame is displayed. In addition, for example, according to the technique disclosed in PTL 2, a frame period consists of a video period and an extension period, and a display panel is controlled such that the display panel emits light during a video period and the display panel emits light or turns off light at a predetermined duty during an extension period.

CITATION LIST

Patent Literature

PTL 1: Japanese Unexamined Patent Application Publication No. 2019-015794

PTL 2: Japanese Unexamined Patent Application Publication No. 2018-205457

SUMMARY

Technical Problem

Despite the above, with the techniques disclosed in PTLs 1 and 2, since images are switched subframe by subframe (a certain number of lines by a certain number of lines), there may be a delay in displaying an image corresponding to a video signal depending on the timing at which the video signal is obtained.

Accordingly, the present disclosure provides a control device, a display apparatus, and a control method capable of suppressing a flickering phenomenon as well as suppressing a delay that could occur when images switch.

Solution to Problem

A control device according to one aspect of the present disclosure is a control device for a display panel for applications where a frame period in which a same image continues to be displayed varies from frame to frame within a certain range or the frame period is temporarily stable across frames and where a precise frame period is undetermined beforehand, and the control device controls the display panel such that, when a frame having a length exceeding a preset number of lines is input, the display panel displays an image over a frame period corresponding to the preset number of lines and an added period added after the frame period, the added period includes one or more individual added periods each including a light emission period and a light extinction period, and the one or more individual added periods are each a period corresponding a predetermined number of lines.

A display apparatus according to one aspect of the present disclosure includes: the above control device; and the display panel that includes a gate driving circuit to which a control signal is input from the control device, and a source driving circuit to which a video signal is input from the control device.

A control method according to one aspect of the present disclosure is a control method for use for a display panel when, although a frame period in which same image continues to be displayed varies from frame to frame within a certain range or the frame period is temporarily stable between frames, a precise frame period is undetermined beforehand, and the control method includes: controlling the display panel such that, when a frame having a length exceeding a preset number of lines is input, the display panel displays an image over a frame period corresponding to the preset number of lines and an added period added after the frame period, wherein the added period includes one or more individual added periods each including a light emission period and a light extinction period, and the one or more individual added periods are each a period corresponding a predetermined number of lines.

Advantageous Effects

Some aspects of the present disclosure can achieve a control device and so on capable of suppressing a flickering phenomenon as well as suppressing a delay that could occur when images switch.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
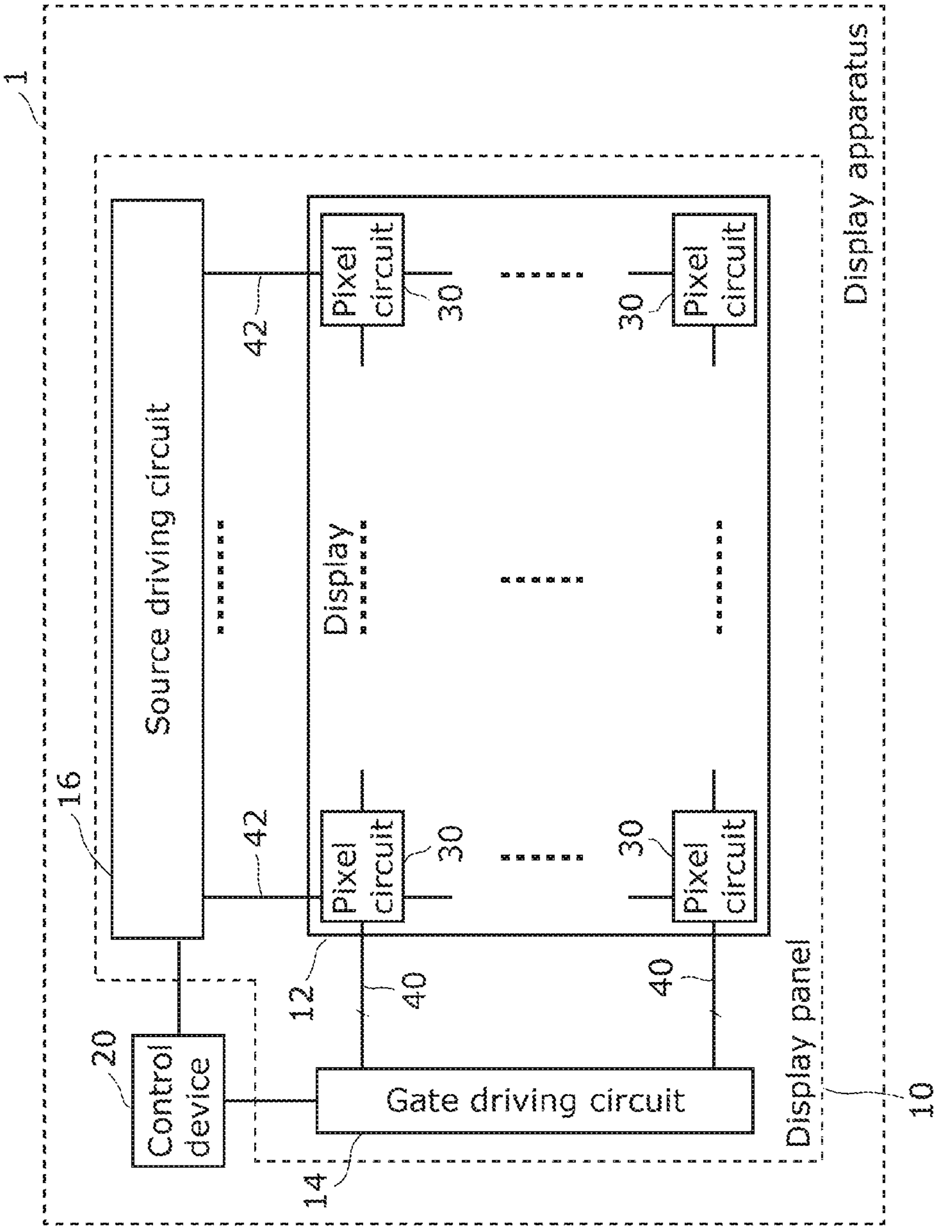
FIG. 1 is a schematic diagram illustrating an example of a configuration of a display apparatus according to an embodiment.

Hereinafter, some embodiments will be described in concrete terms with reference to the drawings.

The embodiments described below merely illustrate general or specific examples. The numerical values, the shapes, the constituent elements, the arrangement positions and the connection modes of the constituent elements, the steps, the order of the steps, and so on illustrated in the following embodiments are examples and are not intended to limit the present disclosure. For example, an expression, such as "match" or "the same", expressing a relationship between elements, a numerical value, or a numerical range is not to be construed only in its strict sense but to be construed to include a substantially equal range—e.g., a difference of approximately several percentage points (e.g., approximately 5%). Among the constituent elements described in the following embodiments, any constituent element that is not described in the independent claims is to be construed as an optional constituent element.

Moreover, the drawings are schematic diagrams and do not necessarily provide the exact depictions. Therefore, the scales and so on do not necessarily match among the drawings, for example. In the drawings, substantially identical configurations are given identical reference characters, and duplicate description thereof will be omitted or simplified.

Embodiment

Hereinafter, a control device and so on according to the present embodiment will be described with reference to FIG. 1 to FIG. 9. In examples described according to the present embodiment, organic electroluminescence (EL) elements are used in a display apparatus.

[1. Configuration of Display Apparatus]

First, a configuration of a display apparatus that includes a control device according to one aspect of the present disclosure will be described with reference to FIG. 1. FIG. 1 is a schematic diagram illustrating an example of a configuration of display apparatus 1 according to the present embodiment.

As illustrated in FIG. 1, display apparatus 1 includes display panel 10 and control device 20. Display apparatus 1 is driven, for example, in a progressive driving method for an organic EL light emitting panel.

[1-1. Configuration of Display Panel]

Display panel 10 includes display 12 including a plurality of pixel circuits 30. Display panel 10 further includes, as peripheral circuits of display 12, gate driving circuit 14 and source driving circuit 16. Herein, display 12, gate driving circuit 14, source driving circuit 16, scanning lines 40, and signal lines 42 are mounted, for example, on a panel substrate (not illustrated) formed by a glass resin, an acrylic resin, or the like.

Display 12 displays a video image based on a video signal (video signals R, G, and B) input to display apparatus 1 from the outside. As illustrated in FIG. 1, display 12 includes the plurality of pixel circuits 30 arranged in a matrix, and rows of scanning lines 40 and columns of signal lines 42 are arranged in display 12. In display 12, an initialization operation, a writing operation, and a light emission operation are executed sequentially on each row of the plurality of pixel circuits 30.

The plurality of pixel circuits 30 are provided in display panel 10 and arranged in a matrix. To be more specific, each of the plurality of pixel circuits 30 is disposed at a location where scanning line 40 and signal line 42 intersect with each other. This description will be elaborated later.

Scanning lines 40 are provided for the respective rows of the plurality of pixel circuits 30. One end of each scanning line 40 is connected to pixel circuit 30, and another end of each scanning line 40 is connected to gate driving circuit 14.

Signal lines 42 are provided for the respective columns of the plurality of pixel circuits 30. One end of each signal line 42 is connected to pixel circuit 30, and another end of each signal line 42 is connected to source driving circuit 16.

Gate driving circuit 14 is also referred to as a scanning line driving circuit and is constituted, for example but not limited to, by a shift register (see FIG. 3 described later). Gate driving circuit 14 is connected to scanning lines 40. Gate driving circuit 14 controls the on and off of transistors in respective pixel circuits 30 by outputting gate controlling signals to scanning lines 40. According to the present embodiment, gate driving circuit 14 outputs, as gate controlling signals for controlling the on and off of each transistor of pixel circuit 30, for example, control signal WS, control signal REF, control signal INI, and light extinction signal EN to the gate (the gate electrode) of each transistor of pixel circuit 30. Control signal WS, control signal REF, control signal INI, and light extinction signal EN are each an example of a control signal.

Source driving circuit 16 is also referred to as a signal line driving circuit. Source driving circuit 16 is connected to signal lines 42. Source driving circuit 16 outputs, to each signal line 42, a video signal supplied from control device 20 on a frame by frame basis and thus supplies the video signal to each pixel circuit 30. Source driving circuit 16, via signal lines 42, writes luminance information that is based on a video signal into each pixel circuit 30 in the form of a current value or a voltage value. Herein, a video signal input to source driving circuit 16 is, for example, digital serial data (video signals R, G, and B) in each color of the three RGB primary colors. Video signals R, G, and B input to source driving circuit 16 are converted to parallel data (an example of an output video signal) on a row by row basis within source driving circuit 16. Furthermore, the parallel data converted on a row by row basis is converted to analog data on a row by row basis within source driving circuit 16, and the resulting analog data is output to signal lines 42 as a video signal.

[1-2. Configuration of Pixel Circuit]

The plurality of pixel circuits 30 are arranged, for example, in a matrix of N rows by M columns. N and M each vary depending on the size or the resolution of the display screen. For example, in a case where pixel circuits 30 corresponding to the three RGB primary colors lie adjacent to each other within a row at a resolution called high definition (HD), N is at least 1080 rows, and M is at least 1920×3 columns. According to the present embodiment, each pixel circuit 30 includes an organic EL element as a light emitting element.

Figure 2:
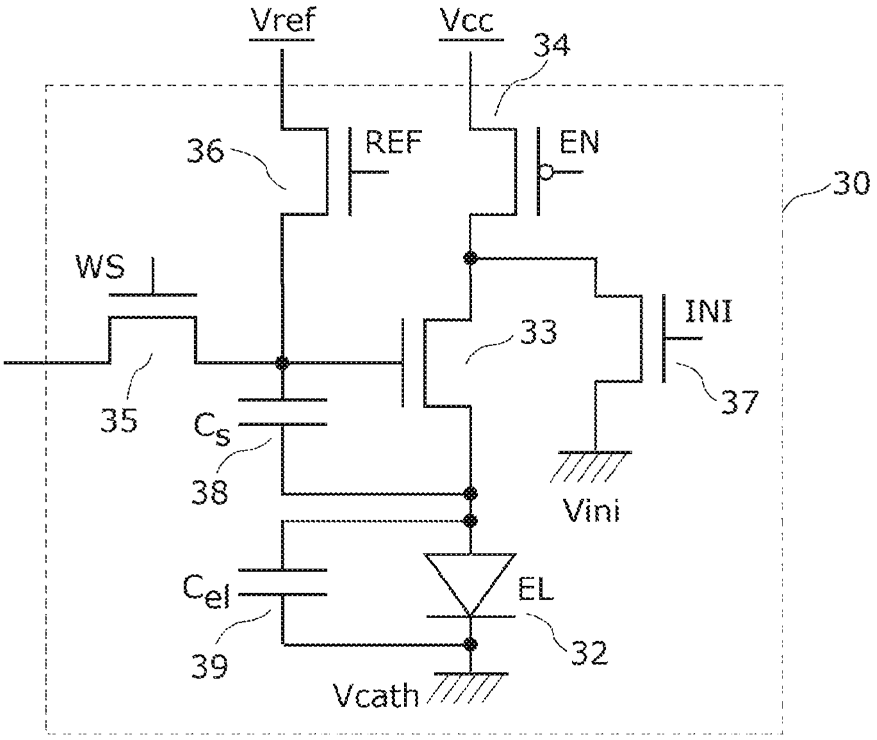
FIG. 2 is a circuit diagram schematically illustrating a configuration of a pixel circuit according to an embodiment.

The configuration of pixel circuit 30 will be described further with reference to FIG. 2. FIG. 2 is a circuit diagram schematically illustrating a configuration of pixel circuit 30 according to the present embodiment.

As illustrated in FIG. 2, pixel circuit 30 includes light emitting element 32, drive transistor 33, switch transistors 34, 36, and 37, selection transistor 35, and pixel capacitance 38. Herein, pixel capacitance 38 is also indicated as Cs in FIG. 2.

Light emitting element 32 has its cathode connected to power source Vcath (a negative power supply line) and has its anode connected to the source of drive transistor 33. Light emitting element 32 is supplied, from drive transistor 33, with a current corresponding to a signal voltage of a video signal, and as this current flows through light emitting element 32, light emitting element 32 emits light at a luminance corresponding to the signal voltage. Light emitting element 32 is, for example, an organic EL element, such as an organic light emitting diode (OLED). For example, pixel circuit 30 (a pixel) constituting display panel 10 that displays an image is constituted by light emitting element 32 that includes an organic EL element and that emits light by current-driving. Herein, light emitting element 32 is not limited to an organic EL element and may instead be a self-luminous element, such as an inorganic EL element or a quantum-dot light emitting diode (QLED), or light emitting element 32 does not need to be a self-luminous element as long as light emitting element 32 is constituted by an element controlled by current-driving.

Drive transistor 33 has its gate connected to one of the electrodes or the like of pixel capacitance 38, has its drain connected to the source of switch transistor 34, and has its source connected to the anode of light emitting element 32. In FIG. 2, the source of drive transistor 33 is also connected to the other one of the electrodes or the like of pixel capacitance 38. Drive transistor 33 converts a signal voltage applied across the gate and the source to a current corresponding to this signal voltage (this current is also referred to as a drain-source current). Then, as drive transistor 33 enters an on state, the drain-source current is supplied to light emitting element 32, and this causes light emitting element 32 to emit light. Drive transistor 33 is constituted, for example, by an n-type thin film transistor (an n-type TFT).

Switch transistor 34 has its gate connected to scanning line 40, has one of its source or drain connected to power source Vcc, and has the other of its source or drain connected to the drain of drive transistor 33. Switch transistor 34 enters an on state or an off state in accordance with light extinction signal EN supplied from scanning line 40. As switch transistor 34 enters an on state, drive transistor 33 becomes connected to power source Vcc, and this causes a drain-source current of drive transistor 33 to be supplied to light emitting element 32. Switch transistor 34 is constituted, for example, by a p-type thin film transistor (a p-type TFT).

Selection transistor 35 has its gate connected to scanning line 40, has one of its source or drain connected to signal line 42, and has the other of its source or drain connected to one of the electrodes of pixel capacitance 38. Selection transistor 35 enters an on state or an off state in accordance with control signal WS supplied from scanning line 40. As selection transistor 35 enters an on state, a signal voltage of a video signal supplied from signal line 42 is applied across the electrodes of pixel capacitance 38, and this causes an electric charge corresponding to the signal voltage to be accumulated in pixel capacitance 38. Selection transistor 35 is constituted, for example, by an n-type thin film transistor (an n-type TFT).

Switch transistor 36 has its gate connected to scanning line 40, has one of its source or drain connected to power source Vref, and has the other of its source or drain connected to one of the electrodes or the like of pixel capacitance 38. Switch transistor 36 enters an on state or an off state in accordance with control signal REF supplied from scanning line 40. As switch transistor 36 enters an on state, the voltage across the electrodes of pixel capacitance 38 is set to the voltage of power source Vref (a reference voltage). Switch transistor 36 is constituted, for example, by an n-type thin film transistor (an n-type TFT).

Switch transistor 37 has its gate connected to scanning line 40, has one of its source or drain connected to the source of switch transistor 34 and the drain of drive transistor 33, and has the other of its source or drain connected to power source Vini. Switch transistor 37 enters an on state or an off state in accordance with control signal INI supplied from scanning line 40. As switch transistor 37 enters an on state while drive transistor 33 is in an on state and switch transistor 34 is in an on state and is disconnected from power source Vcc, the anode of light emitting element 32 becomes set to the voltage of power source Vini (a reference voltage). Switch transistor 37 is constituted, for example, by an n-type thin film transistor (an n-type TFT).

Pixel capacitance 38 is a capacitor having one of its electrodes connected to the gate of drive transistor 33, the source of selection transistor 35, and the source of switch transistor 36 and having the other one of its electrodes connected to the source of drive transistor 33. Pixel capacitance 38 accumulates an electric charge corresponding to a signal voltage supplied from signal line 42. Pixel capacitance 38 stably holds the voltage across the gate electrode and the source electrode of drive transistor 33, for example, after selection transistor 35 and switch transistor 36 have each entered an off state. In this manner, pixel capacitance 38 applies a voltage across the gate and the source of drive transistor 33 in accordance with a signal potential of an accumulated electric charge, when selection transistor 35 and switch transistor 36 are both in an off state.

EL capacitance 39 is a parasitic capacitance that exists within an EL element. After this capacitance has been charged and the voltage across the electrodes has risen, a current starts flowing toward the EL element, and the EL element starts emitting light.

Herein, the conductivity type of each of drive transistor 33, selection transistor 35, switch transistor 36, and switch transistor 37 is not limited to what has been mentioned above, and n-type TFTs and p-type TFTs may exist in a mixed manner, as appropriate. Moreover, the conductivity type of switch transistor 34 is not limited to what has been mentioned above, and switch transistor 34 may be an n-type TFT. Each transistor is not limited to a polysilicon TFT and may instead be constituted by, for example, an amorphous silicon TFT.

[1-3. Configuration of Control Device]

Control device 20 is formed, for example, on an external system circuit board (not illustrated) disposed outside display panel 10. Control device 20 has, for example, a function of a timing controller (TCON) and controls an overall operation of display apparatus 1. Specifically, control device 20 outputs, to gate driving circuit 14, a gate controlling signal generated based on vertical synchronization signal VS, horizontal synchronization signal HS, and video period signal DE supplied from the outside. Moreover, control device 20 supplies digital serial data of video signals R, G, and B to source driving circuit 16.

Control device 20 according to the present embodiment is a control device for display panel 10 for applications where a frame period in which the same image continues to be displayed varies from frame to frame within a certain range or the frame period is temporarily stable across frames and where a precise frame period is undetermined beforehand. Control device 20 controls display panel 10 such that, when a frame having a length exceeding a preset number of lines (e.g., a minimum number of lines) is input, display panel 10 displays an image over a minimum frame period corresponding to the minimum number of lines and an added period added after the minimum frame period. Herein, an added period includes one or more individual added periods each including a light emission period and a light extinction period, and the one or more individual added periods are each a period corresponding a predetermined number of lines. This period is, for example, a period corresponding to one horizontal period of each of the predetermined number of lines. According to the present embodiment, the predetermined number of lines is one. In other words, the period corresponding to the predetermined number of lines is a period corresponding to one line (a one-line period). A one-line period is, for example, a period corresponding to one horizontal period. Herein, the minimum number of lines is the number of vertical lines indicating a minimum frame period.

In this manner, control device 20 according to the present embodiment controls display panel 10 such that, when the number of lines of an input frame exceeds a minimum number of lines, control device 20 provides an added period that includes a light emission period and a non-light emission period for each one-line period in dealing with a frame having a length exceeding the minimum number of lines. This control can be rephrased as that when the number of lines of an input frame exceeds a minimum number of lines, control device 20 performs control of extending the frame length on a line by line basis.

Herein, that a precise frame period is undetermined beforehand means, for example, that a frame period is changed in accordance with an input video signal. Meanwhile, a one-line period is an example of a line period corresponding to one line (an example of a predetermined number of lines) into which the same signal voltage is written.

Herein, the minimum number of lines is a value common to all the frames and is, for example, the number of lines that is based on the frame rate of a video signal. The minimum number of lines is, for example, the number of lines that is supplied from the outside and required to draw one frame. The minimum number of lines is, for example, the number of lines that is based on the number of display lines of display 12 and a blanking period.

Although the illustration is omitted, control device 20 includes a synchronization controller and a duty controller. The synchronization controller receives vertical synchronization signal VS, horizontal synchronization signal HS, and video period signal DE from the outside and controls the timing at which video signals R, G, and B are displayed on display 12. The duty controller generates a gate controlling signal for controlling gate driving circuit 14 such that video signals R, G, and B are displayed on display 12 at a desired timing. Control device 20 may further include a frame memory. The frame memory may be a buffer that temporarily holds video signals R, G, and B input from a signal source external to display panel 10.

The duty controller detects the reception of vertical synchronization signal VS or video period signal DE. Moreover, the duty controller generates a control signal that causes a minimum frame period and an added period to be executed.

The duty controller generates and outputs a control signal such that, in a minimum frame period of a current frame, light emission and light extinction are performed in, respectively, the length of a light emission period and the length of a light extinction period in the minimum frame period of the current frame set in advance.

Moreover, the duty controller, for example, generates a control signal such that the on-duty in each of one or more individual added periods of a current frame matches the on-duty of a minimum frame period of the current frame and outputs the generated control signal to gate driving circuit 14.

A configuration of gate driving circuit 14 according to the present embodiment will be described with reference to FIG. 3. FIG. 3 is a diagram illustrating a configuration of gate driving circuit 14 according to the present embodiment. FIG. 3 illustrates a configuration for generating a gate controlling signal (light extinction signal EN illustrated in FIG. 2) to be input to switch transistor 34. In addition, FIG. 3 illustrates a configuration covering from a first line to a third line among a plurality of lines.

Figure 3:
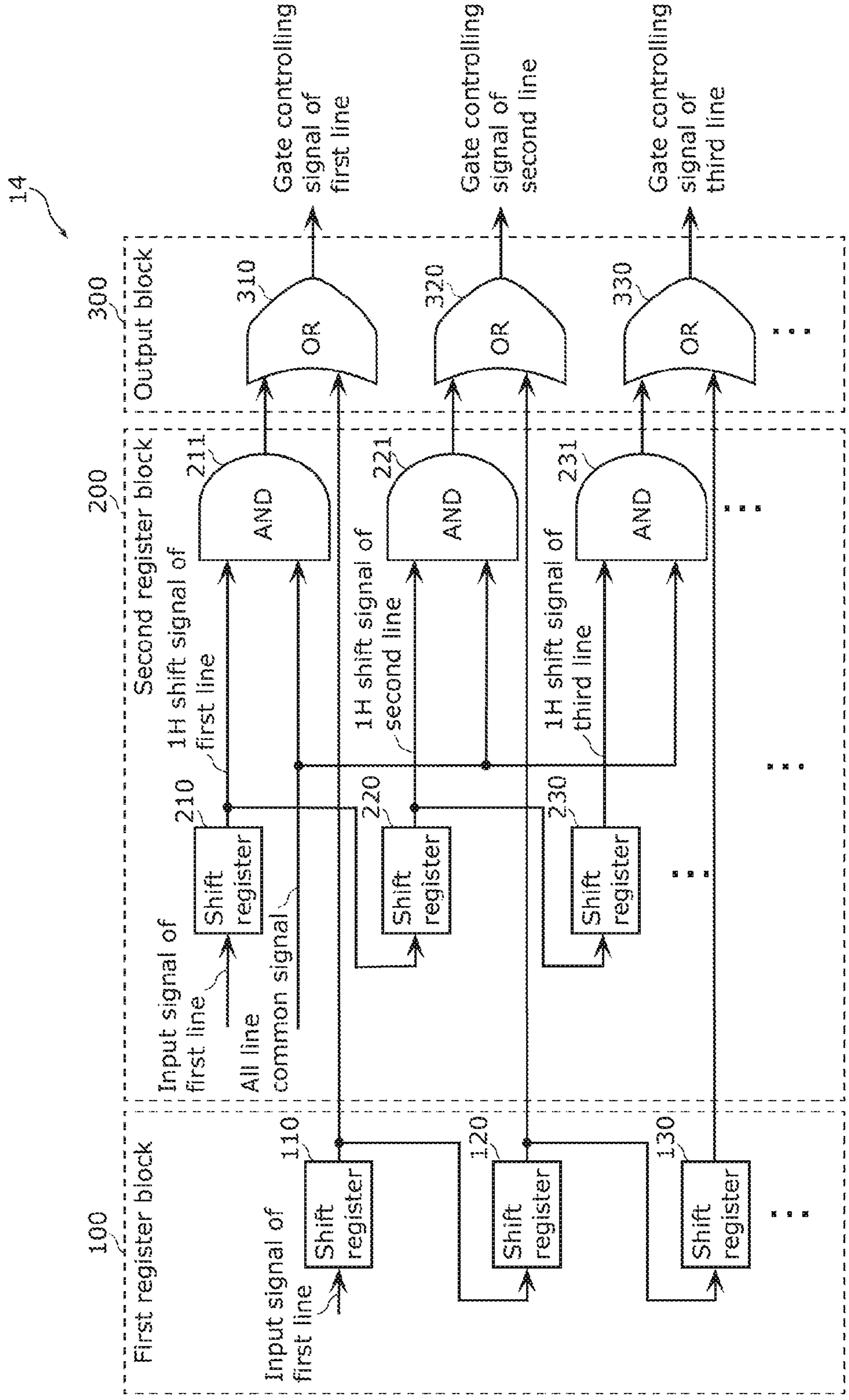
FIG. 3 is a diagram illustrating a configuration of a gate driving circuit according to an embodiment.

As illustrated in FIG. 3, gate driving circuit 14 includes first register block 100, second register block 200, and output block 300. First register block 100 and second register block 200 are provided to output gate controlling signals to scanning lines 40 connected to respective switch transistors 34. First register block 100 and second register block 200, for example, output signals to output block 300 at mutually different timings.

First register block 100 outputs a signal for generating a gate controlling signal that controls the on and off of switch transistor 34 in a minimum frame period of a minimum frame period and an added period. First register block 100 includes a plurality of shift registers (shift register circuits) connected in series, and the plurality of shift registers are connected, via output block 300, to scanning lines 40 connected to respective switch transistors 34. The plurality of shift registers include shift registers 110, 120, and 130. In the following description, the plurality of shift registers included in first register block 100 are also referred to as a plurality of shift registers 110 and so on. The plurality of shift registers 110 and so on each have the same circuit configuration, for example.

Shift register 110, in response to receiving an input of an input signal of the first line, outputs this input signal of the first line to OR circuit 310 of output block 300 and to shift register 120 in accordance with a clock signal. An output signal output from shift register 110 to OR circuit 310 of output block 300 is used to generate a gate controlling signal of the first line for use in a minimum frame period. Meanwhile, an output signal output to shift register 120 is used as an input signal in shift register 120. Herein, the input signal of the first line is, for example, a signal for initialization writing of the first line.

Shift register 120, in response to receiving an input of the output signal from shift register 110, outputs this output signal to OR circuit 320 of output block 300 and to shift register 130 in accordance with a clock signal. Meanwhile, shift register 130, in response to receiving an input of the output signal from shift register 120, outputs this output signal to OR circuit 330 of output block 300 in accordance with a clock signal.

Second register block 200 outputs a signal for generating a gate controlling signal that controls the on and off of switch transistor 34 in an added period of a minimum frame period and an added period. Second register block 200 includes a plurality of shift registers (shift register circuits) and a plurality of AND circuits. The plurality of shift registers are connected in series, and the plurality of shift registers are connected, via their corresponding AND circuits and output block 300, to scanning lines 40 connected to respective switch transistors 34.

The plurality of shift registers include shift registers 210, 220, and 230. In the following description, the plurality of shift registers included in second register block 200 are also referred to as a plurality of shift registers 210 and so on. The plurality of shift registers 210 and so on each have the same circuit configuration, for example. Meanwhile, the plurality of AND circuits include AND circuits 211, 221, and 231. In the following description, the plurality of AND circuits included in second register block 200 are also referred to as a plurality of AND circuits 211 and so on. The plurality of AND circuits 211 and so on each have the same circuit configuration, for example.

The plurality of AND circuits 211 and so on each receive an input of an all line common signal, which is common to all the lines.

Shift register 210, in response to receiving an input of an input signal of the first line, outputs this input signal of the first line to AND circuit 211 and shift register 220 in accordance with a clock signal. In this example, an output signal output from shift register 210 to AND circuit 211 is referred to as a 1H shift signal of the first line (see FIG. 6 to FIG. 8). Herein, a signal output from shift register 210 to shift register 220 is, for example, a signal similar to the 1H shift signal of the first line.

AND circuit 211, in response to receiving an input of the shift signal of the first line input from shift register 210 and an input of the all line common signal, outputs a signal that is High to OR circuit 310 if both of the received signals are High, or outputs a signal that is Low to OR circuit 310 in other cases. The output signal output from AND circuit 211 to OR circuit 310 is used to generate a gate controlling signal of the first line for use in an added period.

In a similar manner, AND circuit 221, in response to receiving an input of a 1H shift signal of the second line from shift register 220 (See FIG. 6 and FIG. 7) and an input of the all line common signal, outputs a signal that is High to OR circuit 320 if both of the received signals are High, or outputs a signal that is Low to OR circuit 320 in other cases. Moreover, AND circuit 231, in response to receiving an input of a 1H shift signal of the third line from shift register 230 (See FIG. 6 and FIG. 7) and an input of the all line common signal, outputs a signal that is High to OR circuit 330 if both of the received signals are High, or outputs a signal that is Low to OR circuit 330 in other cases.

Herein, the input signal of the first line is input, for example, from control device 20.

Output block 300 outputs a gate controlling signal of each line based on an output signal output from at least one of first register block 100 or second register block 200.

OR circuit 310 is connected to scanning line 40 connected to switch transistor 34 of the first line and outputs a gate controlling signal to this scanning line 40. OR circuit 310, in response to receiving an input of at least one of a High level signal from shift register 110 or a High level from AND circuit 211, outputs, for example, a gate controlling signal that is High to the first line, that is, a gate controlling signal for turning off switch transistor 34 of the first line. In other cases, OR circuit 310 outputs a gate controlling signal that is Low to the first line, that is, a gate controlling signal for turning on switch transistor 34 of the first line.

OR circuit 320 is connected to scanning line 40 connected to switch transistor 34 of the second line and outputs a gate controlling signal to this scanning line 40. OR circuit 320, in response to receiving an input of at least one of a High level signal from shift register 120 or a High level from AND circuit 221, outputs, for example, a gate controlling signal that is High to the second line, that is, a gate controlling signal for turning off switch transistor 34 of the second line. In other cases, OR circuit 320 outputs a gate controlling signal that is Low to the second line, that is, a gate controlling signal for turning on switch transistor 34 of the second line.

OR circuit 330 is connected to scanning line 40 connected to switch transistor 34 of the third line and outputs a gate controlling signal to this scanning line 40. OR circuit 330, in response to receiving an input of at least one of a High level signal from shift register 130 or a High level from AND circuit 231, outputs, for example, a gate controlling signal that is High to the third line, that is, a gate controlling signal for turning off switch transistor 34 of the third line. In other cases, OR circuit 330 outputs a gate controlling signal that is Low to the third line, that is, a gate controlling signal for turning on switch transistor 34 of the third line.

Figure 4:
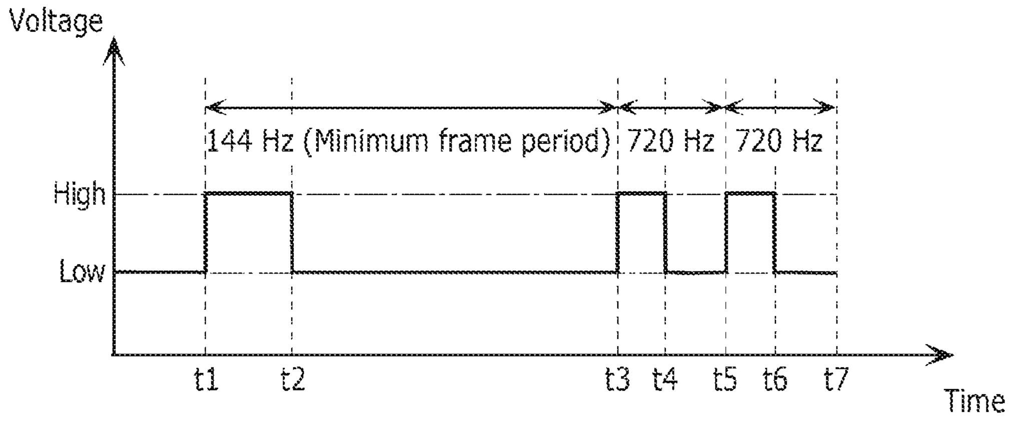
FIG. 4 is a diagram illustrating one example of a gate controlling signal output from a gate driving circuit under the control of a control device according to a comparative example.

Now, a gate controlling signal generated under the control of control device 20 (a signal that gate driving circuit 14 described above outputs) will be described through a comparison with a gate controlling signal generated under the control of a control device according to a comparative example. FIG. 4 is a diagram illustrating one example of a gate controlling signal output from gate driving circuit 14 under the control of a control device according to a comparative example.

Figure 5:
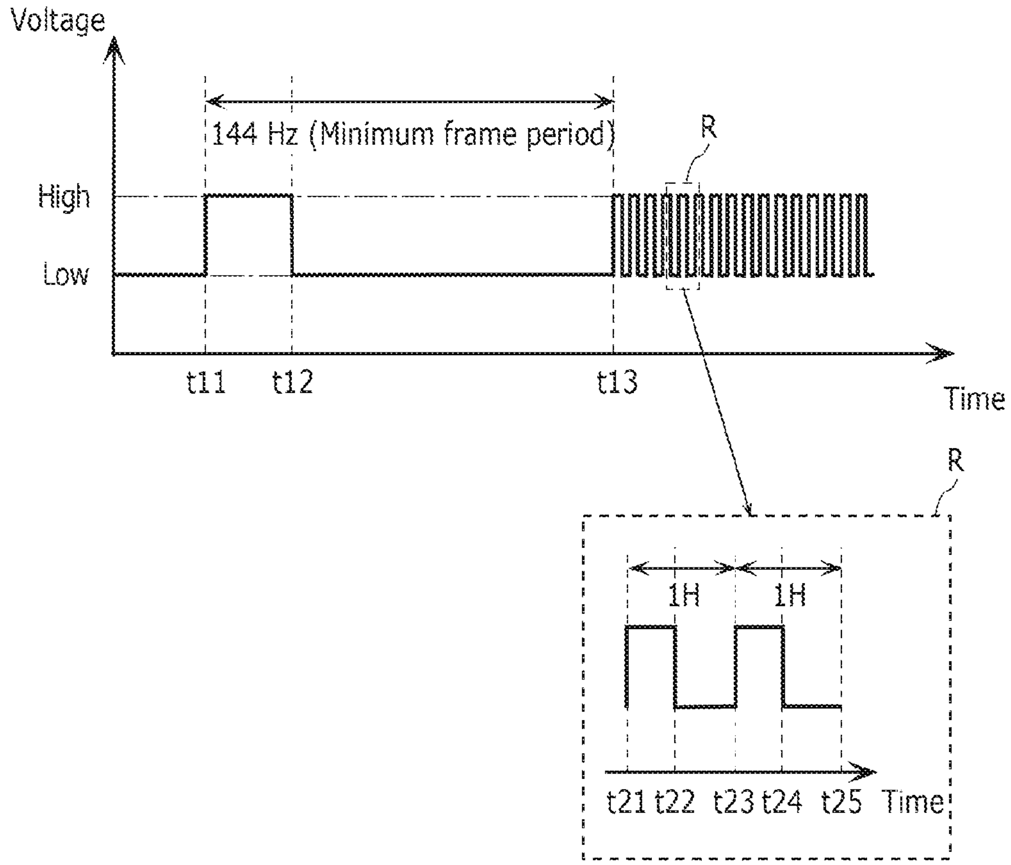
FIG. 5 is a diagram illustrating one example of a gate controlling signal output from a gate driving circuit under the control of a control device according to an embodiment.

FIG. 4 and FIG. 5, described later, each illustrate a waveform of a gate controlling signal input to switch transistor 34 illustrated in FIG. 2. In FIG. 4 and FIG. 5, the horizontal axis represents the time, and the vertical axis represents the voltage. In FIG. 4 and FIG. 5, each period in which the voltage is Low is a period in which switch transistor 34 is on and corresponds to a light emission period.

Herein, as one example, a minimum frame period is a period corresponding to a maximum refresh rate (e.g., 144 Hz). When the maximum refresh rate is 144 Hz, the minimum frame period is about 6.94 msec. The maximum refresh rate is, for example, set based on the minimum number of lines and is the highest refresh rate in control device 20. The maximum refresh rate is stored in advance in a storage of control device 20.

As illustrated in FIG. 4, in the control device according to the comparative example, an added period in which a light emission period and a non-light emission period are repeated at a subframe rate (720 Hz) that is a constant multiple (five times in the example illustrated in FIG. 4) of the maximum frame rate (144 Hz) is provided after the minimum frame period. The minimum frame period spans from time t1 to time t3, in which the period from time t1 to time t2 is a non-light emission period and the period from time t2 to time t3 is a light emission period. The period after time t3 is an added period, and a non-light emission period and a light emission period are repeated at a subframe rate of 720 Hz in the example illustrated in FIG. 4. The period from time t3 to time t4 and the period from time t5 to time t6 are each a non-light emission period, and the period from time t4 to time t5 and the period from time t6 to time t7 are each a light emission period. Meanwhile, the period from time t3 to time t5 is a first instance of a subframe period in the added period, and the period from time t5 to time t7 is a second instance of a subframe period in the added period.

In this example, in a case where the control device according to the comparative example has obtained a video signal of the next frame immediately after time t3 (immediately after the start of the first instance of a subframe period in the added period), the control device starts a minimum frame period of the video signal of the next frame without starting the next subframe period (the second instance of a subframe period in the added period). This means that with the control device according to the comparative example, a delay at maximum in a length of time equivalent to one subframe period in the added period may occur before the start of the frame period corresponding to the received video signal after the video signal has been obtained. This means, in other words, that the start of a frame period may be delayed when an image is switched to another image of the next frame.

In contrast, control device 20 according to the present embodiment minimizes a delay in the start of a frame period when an image is switched to another image of the next frame. FIG. 5 is a diagram illustrating one example of a gate controlling signal output from gate driving circuit 14 under the control of control device 20 according to the present embodiment. The gate controlling signal illustrated in FIG. 5 is a signal output from output block 300 illustrated in FIG. 3. Herein, the gate controlling signal spanning from time t11 to time t13 illustrated in FIG. 5 is the same as the gate controlling signal spanning from time t1 to time t3 illustrated in FIG. 4, and thus description thereof will be omitted. Herein, a frame period includes a minimum frame period and an added period. Of the added period, the waveform in dashed-line region R is illustrated in an enlarged manner.

As illustrated in FIG. 5, control device 20 controls display panel 10 such that in the added period after time t13, a non-light emission period and a light emission period are repeated at intervals shorter than the intervals provided by the control device according to the comparative example. This can be rephrased as that control device 20 performs control of providing an added period in which a light emission period and a non-light emission period are included within a horizontal period. In the example illustrated in FIG. 5, a non-light emission period and a light emission period are repeated in each one-line period (every 1H in FIG. 5). The period from time t21 to time t22 and the period from time t23 to time t24 are each a non-light emission period. The period from time t21 to time t22 and the period from time t23 to time t24 are, for example, periods of the same length. Meanwhile, the period from time t22 to time t23 and the period from time t24 to time t25 are each a light emission period. The period from time t22 to time t23 and the period from time t24 to time t25 are periods of the same length. Meanwhile, the period from time t21 to time t23 is an mth instance (m is an integer no smaller than 1) of a one-line period (an example of an individual added period) in the added period, and the period from time t23 to time t25 is an (m+1)th instance of a one-line period (an example of an individual added period) in the added period.

Herein, the gate controlling signal spanning from time t11 to time t13 is generated based on an output signal from first register block 100, and the gate controlling signal after time t13 is generated based on an output signal from second register block 200.

Herein, a one-line period is, for example, 3 μsec when the minimum frame period is 6.94 msec and the number of lines is 2,314, but this is not a limiting example.

In this example, in a case where control device 20 has obtained a video signal of the next frame immediately after time t21 (immediately after the start of the mth instance of a one-line period), control device 20 can start the minimum frame period of the received video signal of the next frame at the start of the next one-line period (at the start of the (m+1)th instance of a one-line period). For example, the duty controller, in response to detecting a signal indicating the start of a frame period, outputs, to gate driving circuit 14, a control signal that causes an initialization operation and a writing operation for the next frame to be executed in a light extinction period after the end of the one-line period that is being executed at the time of the detection. In other words, the duty controller can start the minimum frame period of the next frame when the one-line period that is being executed at the time of the detection has ended.

Therefore, control device 20 experiences a delay of only a one-line period at maximum before the frame period corresponding to the received video signal starts after the video signal has been obtained. With this configuration, control device 20 according to the present embodiment can outperform the control device according to the comparative example in suppressing a delay when images switch. Moreover, with control device 20, a memory serving as a buffer for storing a video signal corresponding to a subframe is rendered unnecessary, and the memory capacity can be reduced. Thus, a control device that is less expensive and produces less heat than the control device according to the comparative example can be achieved.

When the duty controller detects no signal indicating the start of a frame period, the duty controller outputs a control signal to gate driving circuit 14 to cause gate driving circuit 14 to generate a gate controlling signal that causes a one-line period including a light emission period and a light extinction period of predetermined intervals to be executed repeatedly.

Moreover, the duty controller controls the length of a light extinction period in each of one or more individual added periods such that the ratio between the length of a light emission period (e.g., the length of the period from t22 to time t23 or the length of the period from time t24 to time t25) and the length of a light extinction period (e.g., the length of the period from time t21 to time t22 or the length of the period from time t23 to time t24) in each of one or more individual added periods of a current frame matches the ratio between the length of a light emission period (e.g., the length of the period from time t12 to time t13) and the length of a light extinction period (e.g., the length of the period from time t11 to time t12) in the minimum frame period of the current frame. In other words, the duty controller generates a control signal corresponding to the length of a light extinction period and outputs the generated control signal to gate driving circuit 14.

The length of a light emission period and the length of a light extinction period are each constant across one or more individual added periods. In this manner, an added period is a period in which a light emission period and a light extinction period are repeated at predetermined intervals and can be said to be a blanking period continuing until the next frame is input.

Herein, control device 20 may, for example, control the switch between a light emission period and a non-light emission period in each of one or more individual added periods simultaneously throughout the display screen of display panel 10. Control device 20 may generate a control signal such that a light emission period and a light extinction period are switched therebetween simultaneously in each of the lines of display panel 10 and output the generated control signal to gate driving circuit 14. Herein, a configuration for switching a light emission period and a light extinction period therebetween simultaneously in each of the lines in an added period, that is, a configuration for switching between the on and off of each of switch transistors 34 in the corresponding line simultaneously in an added period will be described in Variation 2 of the embodiment.

Herein, an initialization operation, a writing operation, or the like of pixel circuits 30 may be performed in the period from time t11 to time t12. Initialization of pixel circuits 30 includes initializing light emitting elements 32 and EL capacitances 39 by applying a reverse bias to light emitting elements 32 and EL capacitances 39 and correcting (resetting) the voltage across the electrodes of each pixel capacitance 38 in accordance with a difference in the characteristics of drive transistors 33, before an electric charge corresponding to a signal voltage is accumulated in (written into) each pixel capacitance 38. Meanwhile, the initialization period of pixel circuits 30 is a period for initializing light emitting elements 32 and EL capacitances 39 by applying a reverse bias to light emitting elements 32 and EL capacitances 39 and correcting (resetting) the voltage across the electrodes of each pixel capacitance 38 in accordance with a difference in characteristics of drive transistors 33. According to the present embodiment, light emitting elements 32 are turned off during the initialization period of pixel circuits 30. In other words, the initialization period of pixel circuits 30 is included in a light extinction period (also referred to as a non-light emission period).

Herein, neither an initialization operation nor a writing operation is performed in an added period. This configuration makes it possible to bring the luminance of display panel 10 in a minimum frame period and the luminance of display panel 10 in an added period closer to each other.

Figure 6:
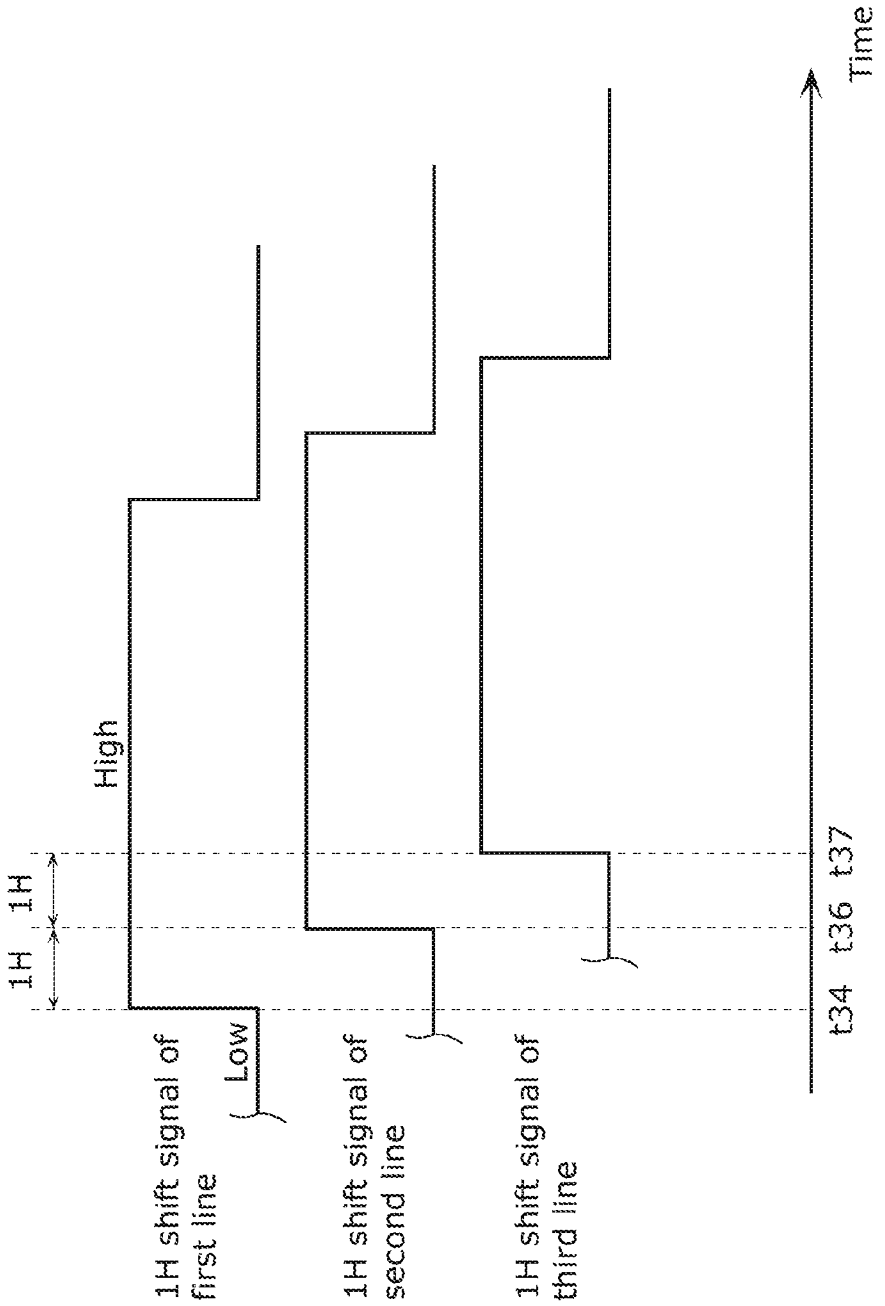
FIG. 6 is a diagram illustrating one example of a control signal input to a gate driving circuit according to an embodiment.

Next, a control signal input to gate driving circuit 14 from control device 20 in an added period and a gate controlling signal output from gate driving circuit 14 to display 12 will be described with reference to FIG. 6 to FIG. 8. FIG. 6 is a diagram illustrating one example of a control signal input to gate driving circuit 14 according to the present embodiment. FIG. 6 illustrates 1H shift signals input to a first line to a third line among a plurality of lines (display lines). The 1H shift signals illustrated in FIG. 6 are signals for generating a gate controlling signal to be input to the gate of switch transistor 34. Specifically, the 1H shift signals illustrated in FIG. 6 are signals to be output from the shift registers to the AND circuits of second register block 200 in an added period.

Figure 7:
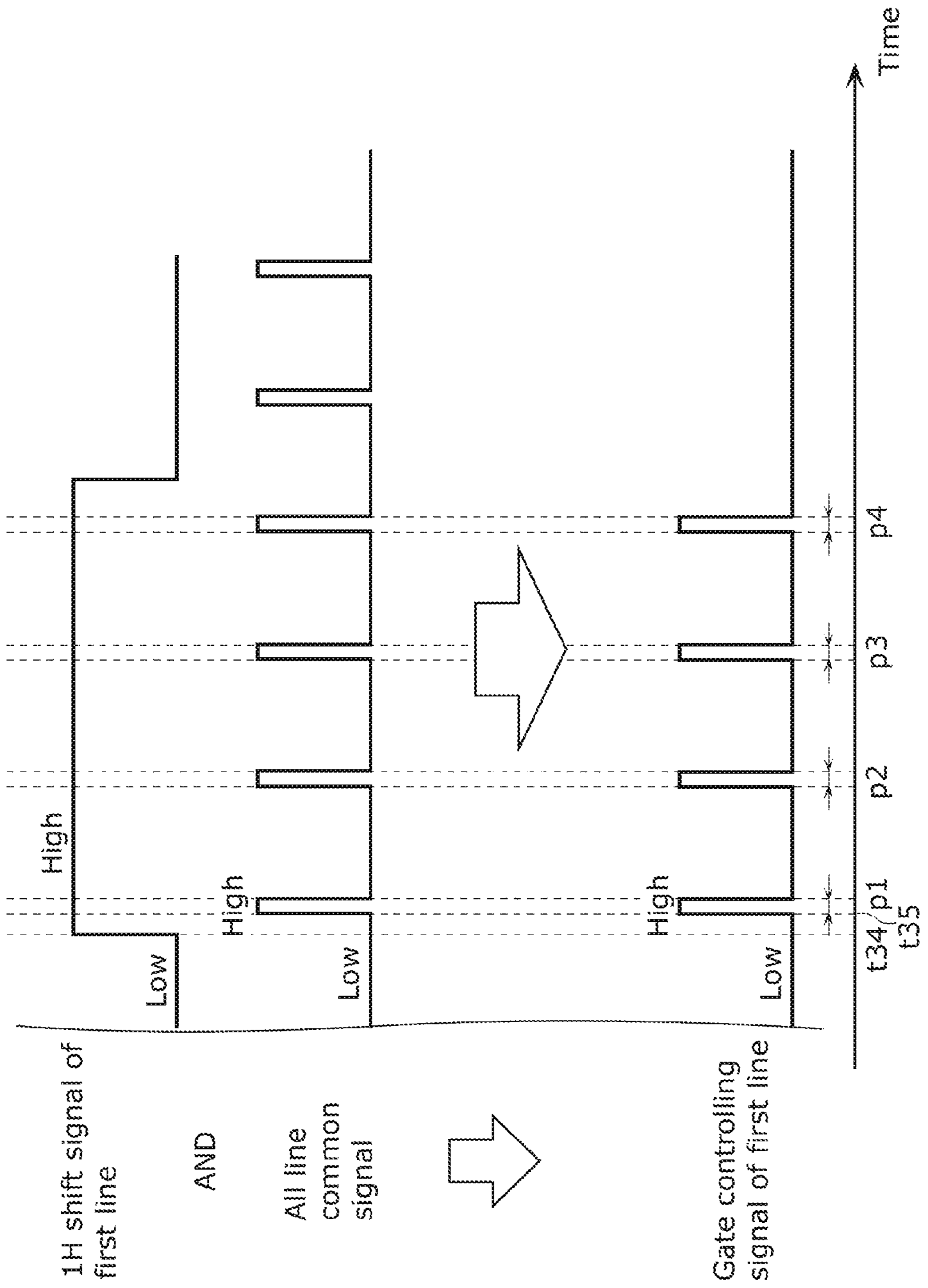
FIG. 7 is a diagram illustrating a control signal input to an AND circuit corresponding to a first line in a gate driving circuit according to an embodiment, and a gate controlling signal of the first line in an added period output from the AND circuit corresponding to the first line based on the control signal.

FIG. 7 is a diagram illustrating control signals input to AND circuit 211 corresponding to the first line of gate driving circuit 14 according to the present embodiment and a gate controlling signal of the first line in an added period that is output from AND circuit 211 corresponding to the first line based on the control signal. The gate controlling signal of the first line in an added period illustrated in FIG. 7 indicates a gate controlling signal in an added period that is input to the gate of each of the plurality of switch transistors 34 disposed on the first line. Herein, the first line, the second line, and the third line are display lines formed side by side in this order in display 12.

As illustrated in FIG. 6, 1H shift signals whose waveforms are successively offset from each other by one horizontal period (by 1H) are input to AND circuit 211 corresponding to the first line, AND circuit 221 corresponding to the second line, and AND circuit 231 corresponding to the third line. Specifically, a 1H shift signal that switches from Low to High at time t34 is input to AND circuit 211 corresponding to the first line, a 1H shift signal that switches from Low to High at time t36 is input to AND circuit 221 corresponding to the second line, and a 1H shift signal that switches from Low to High at time t37 is input to AND circuit 231 corresponding to the third line. For example, the duration of the High period and the duration of the Low period are constant across all the 1H shift signals of the plurality of lines, including the first line to the third line.

As illustrated in FIG. 7, a 1H shift signal of the first line and an all line common signal are input to AND circuit 211 corresponding to the first line. The 1H shift signal of the first line is a shift signal input to AND circuit 211 corresponding to the first line and is a signal identical to the 1H shift signal of the first line illustrated in FIG. 6.

Gate driving circuit 14 includes, for example, a plurality of OR circuits 310 and so on included in output block 300. Then, gate driving circuit 14 is configured to output, for example, a gate controlling signal that is Low during the period in which the 1H shift signal of the first line and the all line common signal are both Low and that is High during the period in which either of the 1H shift signal of the first line and the all line common signal is High. With this configuration, the gate controlling signal of the first line results in a signal that is High (a non-light emission period) during each of periods p1, p2, p3, and p4 (also referred to below as periods p1 and so on). The length of a non-light emission period and the length of a light emission period in an added period illustrated in FIG. 5 can be adjusted by adjusting the temporal length of periods p1 and so on. Herein, periods p1, p2, p3, and p4 are periods of the same length.

A gate controlling signal of each line will be described with reference to FIG. 8. FIG. 8 is a diagram illustrating a gate controlling signal of each line according to the present embodiment. The gate controlling signals illustrated in FIG. 8 are signals output from output block 300 of gate driving circuit 14 and input to switch transistors 34.

A gate controlling signal of a minimum frame period is a signal generated based on an output signal from first register block 100. Gate control signals whose waveforms are successively offset from each other by one horizontal period (by 1H) from are output to OR circuit 310 corresponding to the first line, OR circuit 320 corresponding to the second line, and OR circuit 330 corresponding to the third line. Specifically, a gate controlling signal of the first line that switches from Low to High at time t31 is output to the gate of switch transistor 34 of the first line, a gate controlling signal of the second line that switches from Low to High at time t32 is output to the gate of switch transistor 34 of the second line, and a gate controlling signal of the third line that switches from Low to High at time t33 is output to the gate of switch transistor 34 of the third line.

Herein, gate controlling signals of a minimum frame period of the next frame may be the same as the gate controlling signals of the minimum frame period described above. Time t38 in the minimum frame period of the next frame is the time that corresponds to time t31 in the minimum frame period.

A gate controlling signal of an added period is a signal generated based on an output signal from second register block 200. Gate control signals whose waveforms are successively offset from each other by one horizontal period (by 1H) are output from OR circuit 310 corresponding to the first line, OR circuit 320 corresponding to the second line, and OR circuit 330 corresponding to the third line. Specifically, a gate controlling signal of the first line that switches from Low to High at time t35 is output to the gate of switch transistor 34 of the first line. Moreover, a gate controlling signal of the second line that switches from Low to High in one horizontal period from time t35 is output to the gate of switch transistor 34 of the second line, and a gate controlling signal of the third line that switches from Low to High in another one horizontal period after the aforementioned gate controlling signal has been output to the gate of switch transistor 34 of the third line. An added period of each line is started successively every one horizontal period.

The gate controlling signal of the first line and the gate controlling signal of the second line become High simultaneously in period p2, and the gate controlling signal of the first line, the gate controlling signal of the second line, and the gate controlling signal of the third line become High simultaneously in periods p3 and p4. In other words, the on and off of switch transistor 34 of each line are switched simultaneously in period p3 and period p4.

Figure 8:
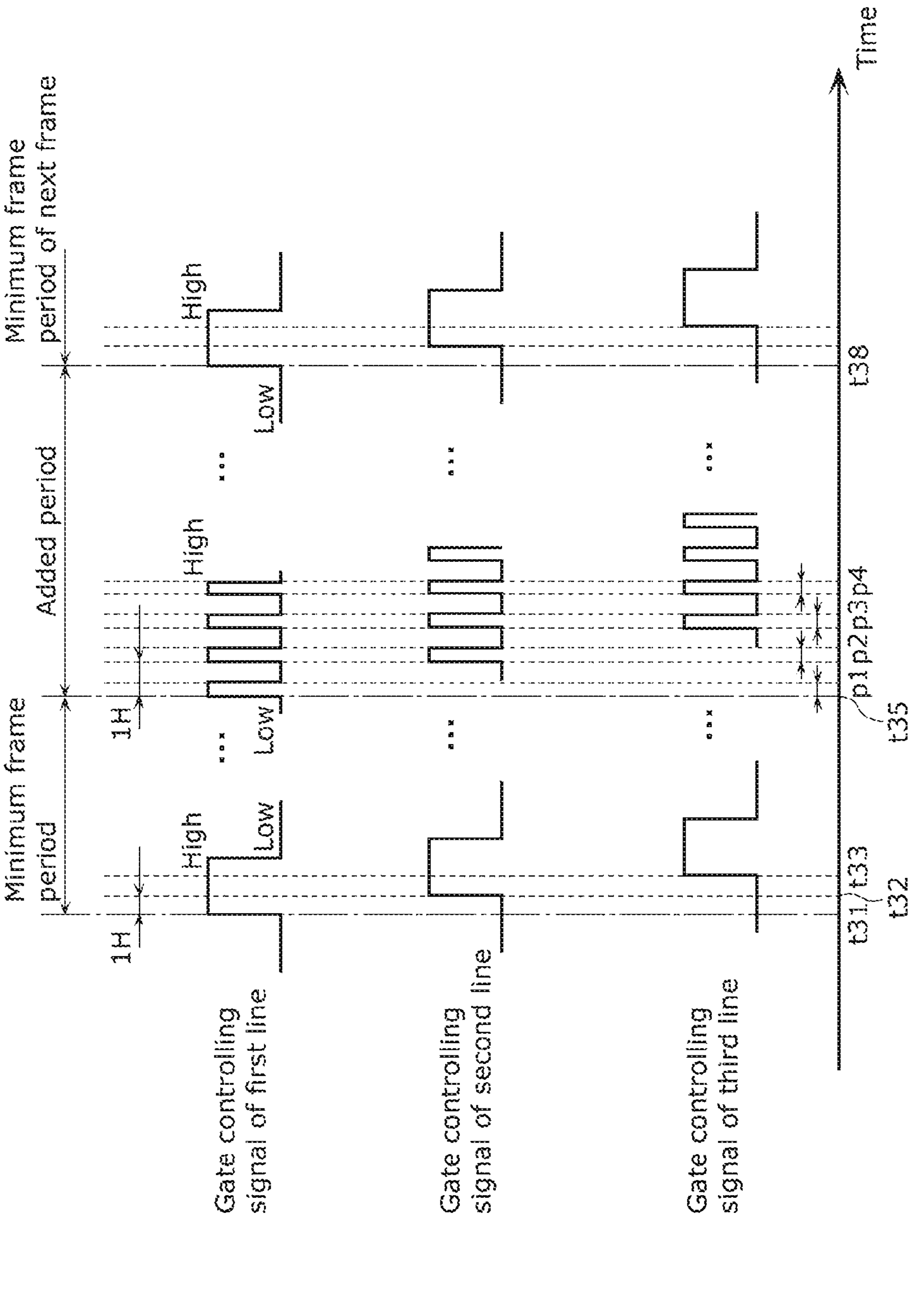
FIG. 8 is a diagram illustrating a gate controlling signal of each line according to an embodiment.

Herein, periods p1 to p4 illustrated in FIG. 8 correspond to periods p1 to p4 illustrated in FIG. 7.

[2. Operation of Control Device]

Figure 9:
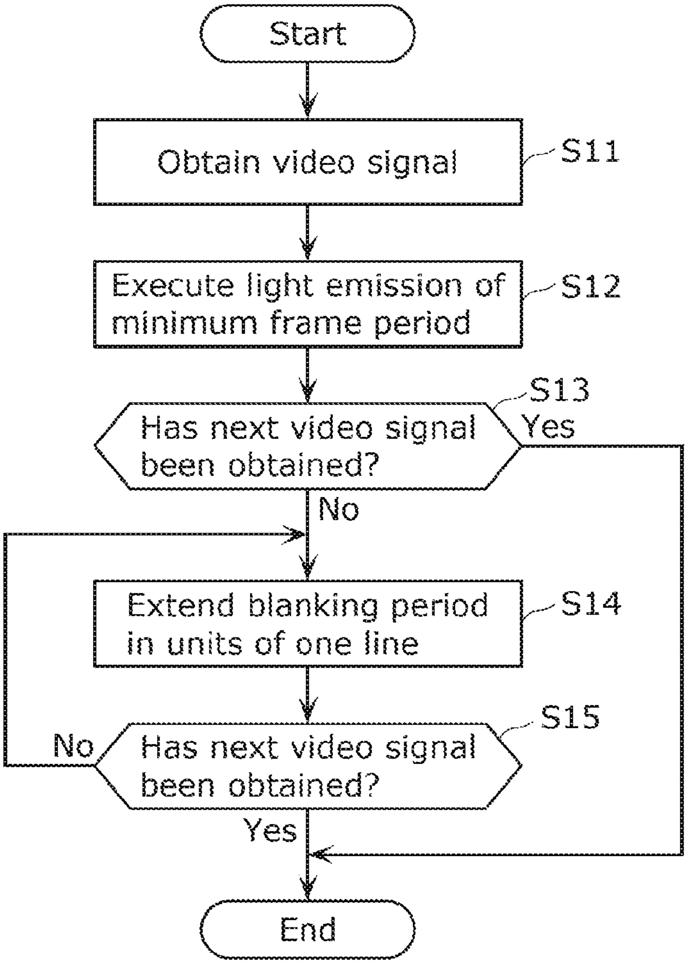
FIG. 9 is a flowchart illustrating an operation of a control device according to an embodiment.

Next, an operation of control device 20 configured as described above will be described with reference to FIG. 9. FIG. 9 is a flowchart illustrating an operation of control device 20 according to the present embodiment. Herein, steps S11 to S15 illustrated in FIG. 9 correspond to a process for one frame, and the processes at steps S11 to S15 are executed repeatedly for each frame.

As illustrated in FIG. 9, first, control device 20 obtains a video signal from an external signal source (S11). Control device 20, for example, stores the video signal into a storage.

Next, control device 20 executes light emission of a minimum frame period (S12). The minimum frame period is a period corresponding to the minimum frame period (from time t11 to time t13) illustrated in FIG. 5. Control device 20 starts a light emission period by performing an initialization operation and a writing operation in a non-light emission period (from time t11 to time t12) and then setting a gate controlling signal input to the gate of each switch transistor 34 to Low at time t12.

Next, control device 20 determines whether control device 20 has obtained a video signal of the next frame (S13). If control device 20 has obtained the video signal of the next frame (Yes at S13), control device 20 terminates the process for this frame. Meanwhile, if control device 20 has not obtained the video signal of the next frame (No at S13), control device 20 proceeds to step S14.

Next, control device 20 extends a blanking period (an added period) in units of one line (S14). The blanking period is a period corresponding to the period after time t13 illustrated in FIG. 5. Control device 20 controls a gate controlling signal input to the gate of each switch transistor 34 such that a light emission period and a non-light emission period are provided at every one-line period, without performing an initialization operation and a writing operation again, that is, in a state in which an electric charge corresponding to a signal voltage of the video signal obtained at step S11 is accumulated in each pixel capacitance 38.

Next, control device 20 determines whether control device 20 has obtained a video signal of the next frame (S15). Step S15 is, for example, performed continuously during the blanking period.

If control device 20 has obtained the video signal of the next frame during the blanking period (Yes at S15), control device 20 terminates the process for this frame. Meanwhile, if control device 20 has not obtained the video signal of the next frame during the blanking period (No at S15), control device 20 returns to step S14. For example, the blanking period is extended in units of one line until control device 20 obtains the video signal of the next frame. In other words, the blanking period (the added period) is continued, for example, until the next frame is input.

[3. Advantageous Effects and Others]

As described above, control device 20 according to the present embodiment is control device 20 for use for display panel 10 when, although a frame period in which the same image continues to be displayed varies from frame to frame within a certain range or the frame period is temporarily stable between frames, a precise frame period is undetermined beforehand. Control device 20 controls display panel 10 such that, when a frame having a length exceeding a preset number of lines is input, display panel 10 displays an image over a frame period corresponding to the preset number of lines and an added period added after the frame period. Herein, the added period includes one or more individual added periods each including a light emission period and a light extinction period, and the one or more individual added periods are each a period corresponding a predetermined number of lines.

With this configuration, control device 20 can keep the light emission duty constant even when the number of lines varies from frame to frame, and thus flicker can be kept from becoming visually recognizable. Moreover, control device 20 provides an added period such that a line period including a light emission period and a non-light emission period is repeated, and thus a switch can be made in units of one line period when the next frame is input. Accordingly, control device 20 can suppress a flickering phenomenon and also suppress a delay that could occur when images switch.

Moreover, the predetermined number of lines is one, and a period corresponding to the predetermined number of lines is a period corresponding to one line.

With this configuration, control device 20 can keep a delay that could occur when images switch to no greater than a one-line period, and thus control device 20 can further suppress a delay that could occur when images switch.

Moreover, control device 20 controls the length of a light extinction period in each of one or more individual added periods such that the ratio between the length of a light emission period and the length of a light extinction period in each of one or more individual added periods of a current frame matches the ratio between the length of a light emission period and the length of a light extinction period in a frame period of the current frame.

With this configuration, control device 20 can keep flicker from becoming visually recognizable as the ratio between a light emission period and a light extinction period remains constant between in an added period and in a preset frame period. Accordingly, control device 20 can even further suppress a flickering phenomenon.

Moreover, control device 20 retains an added period until the next frame is input.

With this configuration, control device 20 can display an image without any disruption between images even in a case where the frame period, for example, varies from frame to frame within a certain range.

Moreover, control device 20, in response to receiving an input of the next frame in a current individual added period of the added period, performs control such that the frame period corresponding to the next frame starts at the end of the current individual added period.

With this configuration, control device 20 can keep a delay that could occur when images switch to no greater than a one-line period, and thus control device 20 can more reliably suppress a delay that could occur when images switch.

Moreover, pixels constituting display panel 10 are constituted by light emitting elements that include organic EL elements and that emit light by current-driving.

With this configuration, control device 20 can keep flicker from becoming visually recognizable in display panel 10 that includes OLEDs and can suppress a delay that could occur when images switch, even if the frame period greatly varies due to the processing capability or the like of the GPU. In other words, control device 20 can suppress a flickering phenomenon and a delay in image switching in display panel 10 that includes OLEDs, even if the frame period varies.

Moreover, as described above, display apparatus 1 according to the present embodiment includes control device 20 described above and display panel 10 that includes gate driving circuit 14 that receives an input of a control signal from control device 20 and source driving circuit 16 that receives an input of an output video signal from control device 20.

This configuration makes it possible to achieve display apparatus 1 capable of suppressing a flickering phenomenon and a delay in image switching.

Moreover, as described above, the control method according to the present embodiment is a control method for use for display panel 10 when, although a frame period in which the same image continues to be displayed varies from frame to frame within a certain range or the frame period is temporarily stable between frames, a precise frame period is undetermined beforehand. This control method includes controlling display panel 10 such that, when a frame having a length exceeding a preset number of lines is input, display panel 10 displays an image over a frame period corresponding to the preset number of lines and an added period added after the frame period. Herein, the added period includes one or more individual added periods each including a light emission period and a light extinction period, and the one or more individual added periods are each a period of a line period unit corresponding a predetermined number of lines.

This method provides advantageous effects similar to those provided by control device 20 described above.

Variation 1 of Embodiment

Figure 10:
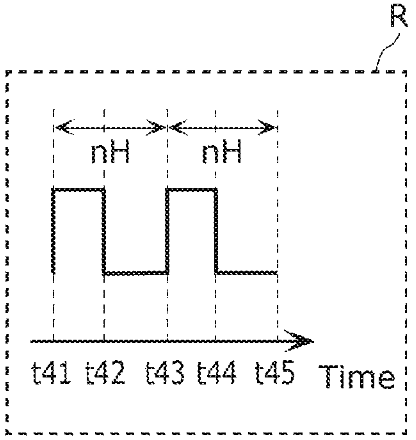
FIG. 10 is a diagram illustrating one example of a gate controlling signal output from a gate driving circuit under the control of a control device according to Variation 1 of an embodiment.

According to the embodiment described above, the control device performs control of providing a light emission period and a non-light emission period for each one-line period in an added period. It is not a limitation that a light emission period and a non-light emission period are provided for each one-line period, and a light emission period and a non-light emission period may be provided for each n-line period (n is an integer no smaller than 2). In the following section, a control device that performs control of providing a light emission period and a non-light emission period for each n-line period will be described with reference to FIG. 10 to FIG. 12. FIG. 10 is a diagram illustrating one example of a gate controlling signal output from gate driving circuit 14 under the control of a control device according to the present variation. FIG. 10 is a diagram illustrating, in an enlarged manner, the part of a gate controlling signal according to the present variation (a gate controlling signal output to the gate of switch transistor 34 in an added period) that corresponds to dashed-line region R indicated in FIG. 5.

As illustrated in FIG. 10, the control device according to the present variation performs control such that a light emission period and a non-light emission period are repeated in each n-line period (nH) in an added period. The period from time t41 to time t42 and the period from time t43 to time t44 are each a non-light emission period. An n-line period is a period corresponding to two or more lines. An n-line period is an example of a period corresponding to a predetermined number of lines, and an n-line period may, for example, be increased twofold when the predetermined number of lines is increased twofold.

The period from time t41 to time t42 and the period from time t43 to time t44 are, for example, periods of the same length. Meanwhile, the period from time t42 to time t43 and the period from time t44 to time t45 are each a light emission period. The period from time t42 to time t43 and the period from time t44 to time t45 are period of the same length. Meanwhile, the period from time t41 to time t43 is an mth instance (m is an integer no smaller than 1) of an n-line period in the added period, and the period from time t43 to time t45 is an (m+1)th instance of an n-line period in the added period. Herein, n lines is an example of a predetermined number of lines.

Figure 11:
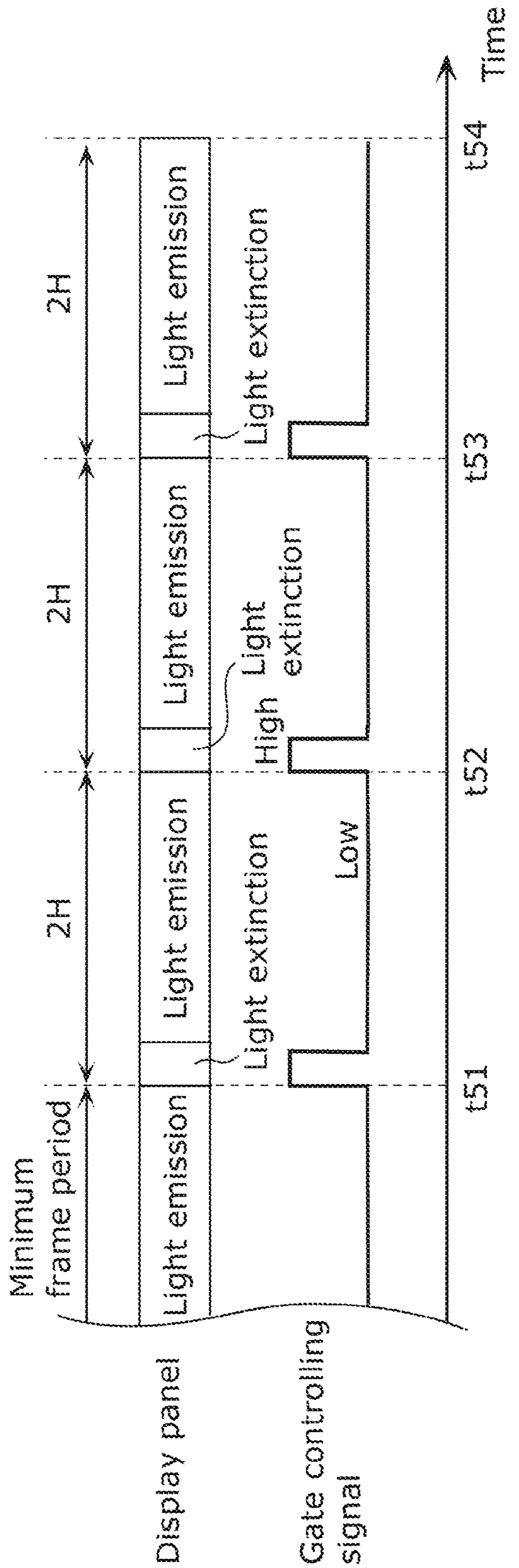
FIG. 11 is a diagram illustrating a gate controlling signal output from a gate driving circuit under the control of a control device according to Variation 1 of an embodiment, and an operation of a display panel.

Next, control performed in a case where n is two (the predetermined number of lines is two) will be described with reference to FIG. 11 and FIG. 12. FIG. 11 is a diagram illustrating a gate controlling signal output from gate driving circuit 14 under the control of the control device according to the present variation, and an operation of display panel 10. Herein, n is not limited to two, and n may be set to, for example, three or higher or a value that is a power of two. The value of n may be set in advance and stored in a storage of the control device. Herein, the gate controlling signal illustrated in FIG. 11 is a signal that is output from gate driving circuit 14 to the gate of switch transistor 34.

As illustrated in FIG. 11, the control device may perform control such that a non-light emission period (light extinction) and a light emission period (light emission) are repeated in each two-line period (2H) in an added period (the period after time t51) following a minimum frame period. The period from time t51 to time t52, the period from time t52 to time t53, and the period from time t53 to time t54 are periods of the same length (2H). Moreover, the ratio between the length of a light emission period and the length of a non-light emission period is constant across all the two-line periods.

In each two-line period, light is turned off for the period from when the gate controlling signal input to the gate of switch transistor 34 becomes High (e.g., times t51, t52, and t53) to when the gate controlling signal becomes Low. In a case where n is two, one cycle duty segment (a non-light emission period and a light emission period) ends every drawing period of two lines (every 2H).

Next, a writing operation into pixel circuits 30 performed in a case where a non-light emission period and a light emission period are repeated in each two-line period as described above will be described with reference to FIG. 12. FIG. 12 is an illustration for describing a writing operation performed by the control device according to the present variation. Each straight line indicated by High or Low illustrated in FIG. 12 indicates a gate controlling signal input to selection transistor 35 from gate driving circuit 14.

Figure 12:
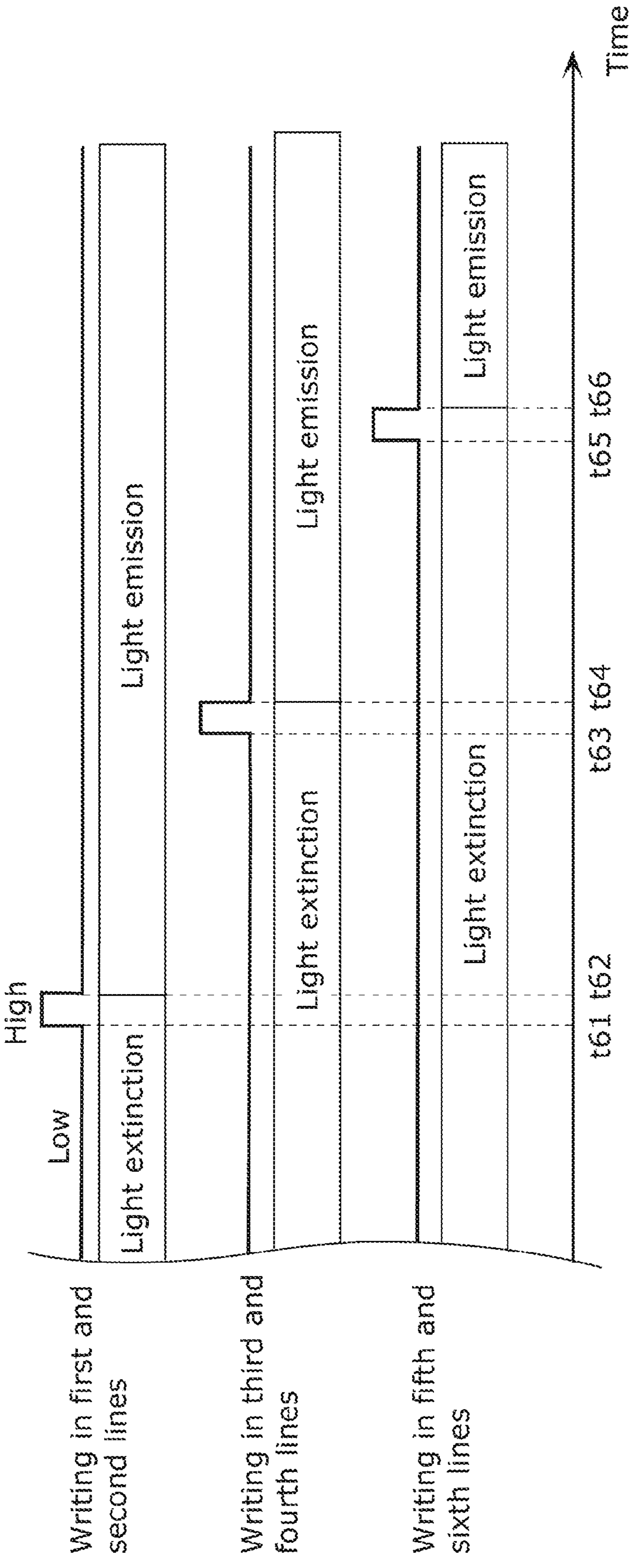
FIG. 12 is an illustration for describing a writing operation performed by a control device according to Variation 1 of an embodiment.

As illustrated in FIG. 12, the control device causes a writing operation to be performed in units of two lines. In other words, in two lines, the same electric charge amount is accumulated in pixel capacitances 38 of pixel circuits 30 connected to same signal line 42. For example, the control device may output, to display panel 10, a control signal for writing a signal voltage simultaneously into two lines (one example of two or more lines). In other words, in two lines, the same electric charge amount may be accumulated simultaneously in pixel capacitances 38 of pixel circuits 30 connected to same signal line 42.

For example, a signal voltage is written simultaneously into a first line and a second line disposed side by side, a signal voltage is written simultaneously into a third line and a fourth line disposed side by side after the aforementioned signal voltage has been written into the first line and the second line, and a signal voltage is written simultaneously into a fifth line and a sixth line disposed side by side after the aforementioned signal voltage has been written into the third line and the fourth line. For example, a signal voltage is written simultaneously into the first line and the second line in the period from time t61 to time t62, and a signal voltage is written simultaneously into the third line and the fourth line in the period from time t63 to time t64, and a signal voltage is written simultaneously into the fifth line and the sixth line in the period from time t65 to time t66.

The gate driving circuit of such display panel 10 is, for example, configured to be capable of outputting identical gate controlling signals to selection transistors 35 of two consecutive lines (e.g., the first line and the second line, the third line and the fourth line, or the fifth line and the sixth line, etc.). For example, selection transistors 35 of the first line and the second line turn on or off simultaneously, selection transistors 35 of the third line and the fourth line turn on or off simultaneously, and selection transistors 35 of the fifth line and the sixth line turn on or off simultaneously.

In this manner, two lines serving as one example of a predetermined number of lines may be the lines into which the same signal voltage is written. Herein, the predetermined number of lines is not limited to the number of lines into which the same signal voltage is written.

As described above, the period corresponding to the predetermined number of lines in the control device according to the present variation is a period corresponding to two or more lines.

With this configuration, the control device can reduce the frequency of turning on or off switch transistors 34, as compared to the case where the predetermined number of lines is one, and thus switching power can be reduced. In other words, the control device according to the present variation can achieve a display apparatus with improved energy saving performance.

Moreover, the control device outputs, to display panel 10, a control signal for writing a signal voltage simultaneously into two or more lines.

With this configuration, as merely a control signal for writing a signal voltage simultaneously into two or more is output, a display apparatus with improved energy saving performance can be achieved.

Variation 2 of Embodiment

Figure 13:
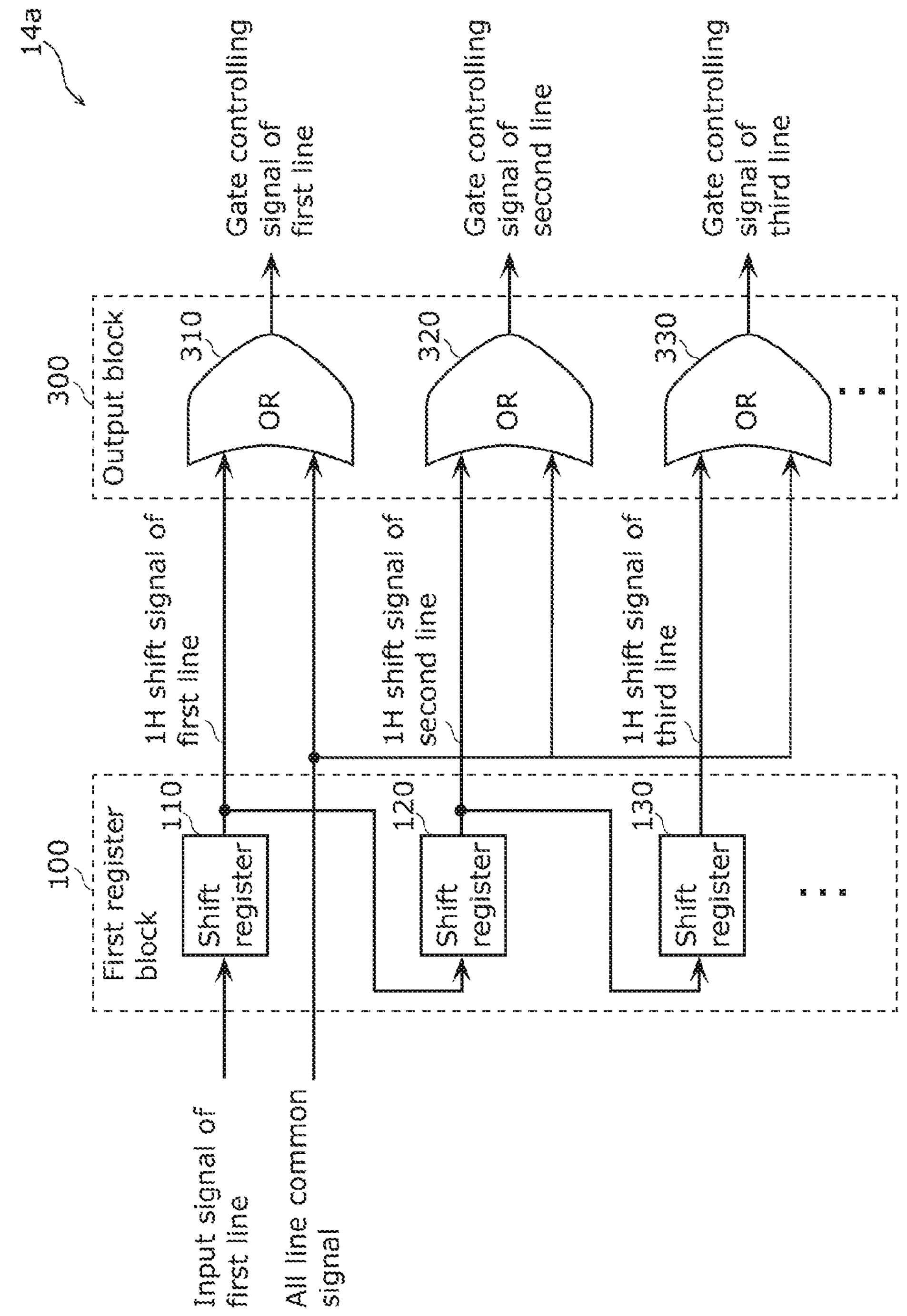
FIG. 13 is a diagram illustrating a configuration of a gate driving circuit according to Variation 2 of an embodiment.

Some configurations of gate driving circuit 14 have been described above according to the embodiment and Variation 1. The configuration of gate driving circuit 14 is not limited to the configurations described above according to the embodiment and Variation 1. Another example of gate driving circuit 14 will be described with reference to FIG. 13 and FIG. 14. Herein, the configuration of the display apparatus other than the configuration of the gate driving circuit may be similar to the configuration described above according to the embodiment, and thus description thereof will be omitted. FIG. 13 is a diagram illustrating a configuration of gate driving circuit 14*a* according to the present variation.

As illustrated in FIG. 13, gate driving circuit 14*a* includes first register block 100 and output block 300.

First register block 100 is similar to first register block 100 according to the embodiment illustrated in FIG. 3, and thus description thereof will be omitted. First register block 100 outputs an output signal for generating a gate controlling signal that controls the on and off of switch transistor 34 in a minimum frame period of a minimum frame period and an added period.

Output block 300 outputs a gate controlling signal of each line based on at least one of an output signal from first register block 100 or an all line common signal. The configuration of output block 300 according to the present variation differs from the configuration of output block 300 according to the embodiment illustrated in FIG. 3 in that an all line common signal is input directly to output block 300 according to the present variation.

OR circuit 310 is connected to scanning line 40 connected to switch transistor 34 of the first line and outputs a gate controlling signal to this scanning line 40. OR circuit 310, in response to receiving an input of at least one of a High level signal from shift register 110 or a High level signal of an all line common signal, outputs a gate controlling signal that is High to the first line, that is, a gate controlling signal for turning off switch transistor 34. When the output signal from shift register 110 and the all line common signal are both Low level signals, OR circuit 310 outputs a gate controlling signal that is Low to the first line, that is, a gate controlling signal for turning on switch transistor 34.

In a minimum frame period, OR circuit 310 outputs a gate controlling signal of the first line that is High or Low based on the output signal from shift register 110. At this point, the all line common signal that is Low is input, for example.

In an added period, OR circuit 310 outputs a gate controlling signal of the first line that is High or Low based on the all line common signal from control device 20. Therefore, all the OR circuits, including OR circuit 310, of output block 300 output identical gate controlling signals. For example, in an added period, the gate controlling signal of the first line, the gate controlling signal of the second line, and the gate controlling signal of the third line may be identical signals.

Figure 14:
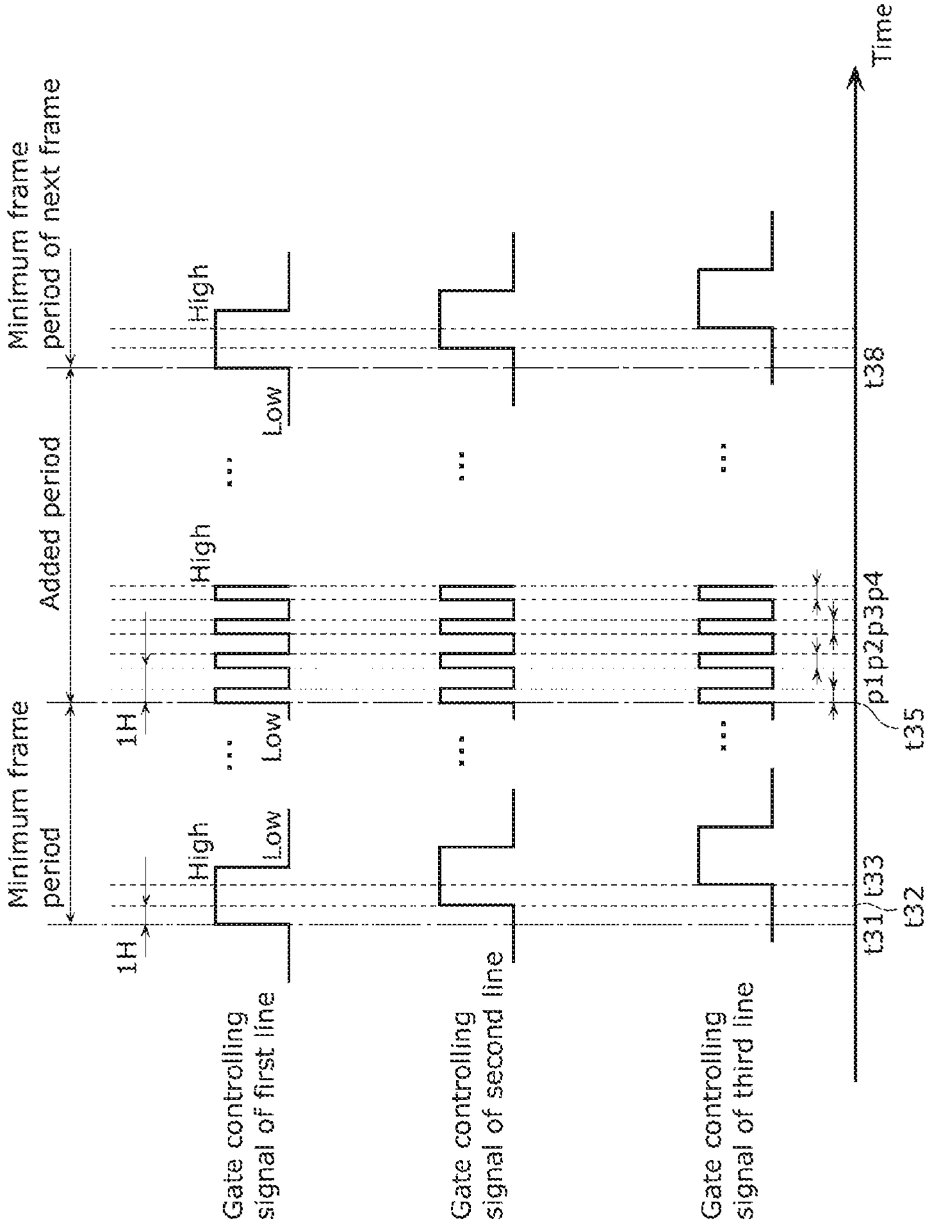
FIG. 14 is a diagram illustrating a gate controlling signal of each line according to Variation 2 of an embodiment.

FIG. 14 is a diagram illustrating a gate controlling signal of each line according to the present variation. For the sake of comparison, the times corresponding to those in FIG. 8 are shown in FIG. 14.

As illustrated in FIG. 14, a gate controlling signal of a minimum frame period is generated based on a switch between High and Low of an output signal from first register block 100. Gate control signals whose waveforms are successively offset from each other by one horizontal period (by 1H) are output from OR circuit 310 corresponding to the first line, OR circuit 320 corresponding to the second line, and OR circuit 330 corresponding to the third line.

A gate controlling signal of an added period is a signal generated based on a switch between High and Low of an all line common signal. Gate control signals start being output simultaneously at time t35 in an added period from OR circuit 310 corresponding to the first line, OR circuit 320 corresponding to the second line, and OR circuit 330 corresponding to the third line. Specifically, gate controlling signals of the first line to the third line that each switch from Low to High at time t35 are output to the gates of switch transistors 34 of the first line to the third line. In this manner, an added period of each line starts simultaneously according to the present variation. In other words, according to the present variation, a switch between a light emission period and a non-light emission period is controlled simultaneously throughout the display screen of display panel 10 in an added period including one or more individual added periods.

According to the present variation, display panel 10 may be a liquid crystal display (LCD) panel. In other words, the pixels constituting display panel 10 may be constituted by liquid crystal elements. In this case, display apparatus 1 may further include a backlight that performs a backlight scan. Meanwhile, control device 20 can switch between a light emission period and a non-light emission period simultaneously throughout the screen by light emission and non-light emission of the backlight provided as a light source of the LCD, and thus control device 20 can achieve an individual added period, for example, by controlling light emission and non-light emission of the backlight simultaneously throughout the screen by use of the backlight of the LCD. For example, a light emission period may be a period in which the backlight is turned on in the backlight scan, and a light extinction period may be a period in which the backlight is turned off.

In this example, the backlight scan is a technique in which the backlight near the line including the pixels to be overwritten is turned off successively. The backlight of a liquid crystal display is normally not synchronized with a video image. However, according to the present variation, the backlight is operated in synchronization with a video image when the backlight scan is performed. Thus, a light emission period is served by a period in which the backlight is turned on in the backlight scan, and a light extinction period is served by a period in which the backlight is turned off.

As described above, control device 20 according to the present variation controls a switch between a light emission period and a non-light emission period in each of one or more individual added periods simultaneously throughout the display screen of display panel 10.

With this configuration, control device 20 can make gate driving circuit 14 less complex, and thus the circuit area of gate driving circuit 14 can be reduced.

Moreover, display panel 10 is a liquid crystal display (LCD).

With this configuration, control device 20 can reduce the circuit area of gate driving circuit 14 in the LCD.

Moreover, display panel 10 is an LCD, a light emission period in an added period is a period in which the backlight is turned on in the backlight scan, and a light extinction period in an added period is a period in which the backlight is turned off.

With this configuration, control device 20 can keep flicker from becoming visually recognizable in display panel 10 that includes liquid crystal even if the frame period of the backlight scan varies greatly. In other words, a flickering phenomenon in display panel 10 that includes liquid crystal can be suppressed even if the frame period of the backlight scan varies. Moreover, the light emission mode of the backlight can be switched in units of n lines in an added period, and thus control device 20 can suppress a delay that could occur when images switch, as compared to the case where the light emission mode of the backlight is switched on a subframe by subframe basis.

Other Embodiments

Thus far, a control device and so on according to one or more aspects have been described on the basis of the embodiment, but the present disclosure is not limited to this embodiment. Unless departing from the spirit of the present disclosure, an embodiment obtained by making various modifications that are conceivable by a person skilled in the art to the embodiment or an embodiment obtained by combining constituent elements in different embodiments may also be included within the present disclosure.

For example, in the examples described according to the foregoing embodiment and so on, the pixels constituting the display panel that displays an image are organic EL elements. Alternatively, these pixels may be constituted by liquid crystal elements. In this case, a light emission period may be a period in which the backlight is turned on in the backlight scan, and a light extinction period may be a period in which the backlight is turned off.

With this configuration, flicker can be kept from becoming visually recognizable in the display panel that includes liquid crystal even if the frame period of the backlight scan varies greatly. In other words, a flickering phenomenon in the display panel that includes liquid crystal can be suppressed even if the frame period of the backlight scan varies. Moreover, the light emission mode of the backlight can be switched in units of n lines in an added period, and thus a delay that could occur when images switch can be suppressed, as compared to the case where the light emission mode of the backlight is switched on a subframe by subframe basis.

Moreover, in the examples described according to the foregoing embodiment and so on, the control device controls the display panel such that, in response of receiving an input of the next frame in a current individual added period of an added period, the control device starts a minimum frame period corresponding to the next frame at the end of the current individual added period, but this is not a limiting example. The control device may control the display panel such that, in response to receiving an input of the next frame, the control device starts a minimum frame period corresponding to the next frame after a predetermined individual added period has passed.

Moreover, in the foregoing embodiments and so on, the constituent elements may each be implemented by a dedicated piece of hardware or may each be implemented through execution of a software program suitable for the corresponding constituent element. The constituent elements may each be implemented as a program executing unit, such as a central processing unit (CPU) or a processor, reads out a software program recorded in a recording medium, such as a hard disk or a semiconductor memory, and executes the software program.

Moreover, the order of executing the steps in the flowchart is for illustrating an example for describing the present disclosure in concrete terms, and the order may differ from the one described above. Some of the steps described above may be executed simultaneously (in parallel) with other steps, or some of the steps described above may not be executed.

Moreover, the division of the functional blocks in the block diagram is merely an example. A plurality of functional blocks may be implemented as a single functional block, a single functional block may be divided into a plurality of functional blocks, or some of the functions may be transferred to another functional block. The functions of a plurality of functional blocks having similar functions may be processed in parallel or through time sharing by a single piece of hardware or software.

Moreover, the control device according to the foregoing embodiments and so on may be implemented by a single device (e.g., a single IC chip) or by a plurality of devices (e.g., a plurality of IC chips).

Moreover, each constituent element of the control device described according to the foregoing embodiments and so on may be implement by software or typically implemented in the form of an LSI circuit, which is an integrated circuit. These constituent elements may each be implemented by a single chip, or a part or the whole of these constituent elements may be implemented by a single chip. Although an LSI circuit is illustrated as an example, depending on the difference in the degree of integration, such a circuit may also be called an IC, a system LSI circuit, a super LSI circuit, or an ultra LSI circuit. The technique for circuit integration is not limited to LSI, and an integrated circuit may be implemented by a dedicated circuit or a general purpose processor. A field programmable gate array (FPGA) that can be programmed after the LSI circuit has been manufactured or a reconfigurable processor in which the connections or the settings of the circuit cells within the LSI circuit can be reconfigured may also be used. Furthermore, when a technique for circuit integration that replaces LSI appears through the advancement in the semiconductor technology or a derived different technique, the constituent elements may be integrated by using such a different technique.

A system LSI circuit is an ultra-multifunctional LSI circuit manufactured by integrating a plurality of processors on a single chip, and is, in particular, a computer system that includes a microprocessor, a read only memory (ROM), a random access memory (RAM), and so on. The ROM stores a computer program. The microprocessor operates in accordance with the computer program, and thus the system LSI circuit implements its functions.

Moreover, one aspect of the present disclosure may be a computer program that causes a computer to execute each characteristic step included in the control method indicated in any one of FIG. 5 to FIG. 9, FIG. 11, and FIG. 12.

Moreover, for example, a program may be a program to be executed by a computer. One aspect of the present disclosure may be a non-transitory computer readable recording medium having such a program recorded thereon. For example, such a program may be recorded on a recording medium, which then may be distributed. For example, a distributed program can be installed onto a device that includes another processor, and the program can be executed by this processor. Thus, the device can perform each process described above.

General or specific aspects of the above may be implemented in the form of a system, a method, an integrated circuit, a computer program, or a non-transitory computer readable recording medium, such as a CD-ROM, or through any desired combination of a system, a method, an integrated circuit, a computer program, and a recording medium. The program may be stored in a recording medium in advance or supplied to a recording medium via a broadband communication network including the internet or the like.

INDUSTRIAL APPLICABILITY

The present disclosure is useful in the technical field of, for example but not limited to, displays for television systems, game consoles, and personal computers, where high-speed, high-resolution display is desired.

The invention claimed is:

1. A control device for a display panel for applications where a frame period, in which a same image continues to be displayed, varies from frame to frame within a certain range or the frame period is temporarily stable across frames, and where a precise frame period is undetermined beforehand, wherein the control device controls the display panel such that, when a frame having a length exceeding a preset number of lines is input, the display panel displays an image over a first frame period corresponding to the preset number of lines and an added period added after the first frame period, the added period includes one or more individual added periods each including a light emission period and a light extinction period, the one or more individual added periods are each an individual period corresponding to a predetermined number of lines, and the added period includes plural individual added periods, each including a light emission period and a light extinction period.

2. The control device according to claim 1, wherein the predetermined number of lines is one, and the individual period corresponding to the predetermined number of lines corresponds to one line.

3. The control device according to claim 1, wherein the individual period corresponding to the predetermined number of lines corresponds to two or more lines.

4. The control device according to claim 3, wherein the control device outputs, to the display panel, a control signal for writing a signal voltage simultaneously into the two or more lines.

5. The control device according to claim 1, wherein the control device controls a switch between the light emission period and the light extinction period in each of the one or more individual added periods simultaneously throughout a display screen of the display panel.

6. The control device according to claim 5, wherein the display panel is a liquid crystal display (LCD).

7. The control device according to claim 1, wherein the control device controls a length of the light extinction period in each of the one or more individual added periods such that a ratio between a length of the light emission period and a length of the light extinction period in each of the one or more individual added periods of the first frame matches a ratio between a length of a light emission period and a length of a light extinction period in the first frame period.

8. The control device according to claim 1, wherein the control device retains the one or more individual added periods until a next frame is input.

9. The control device according to claim 8, wherein the control device controls the display panel such that, in response to the next frame being input in a current individual added period of the one or more individual added periods, the control device starts a second frame period corresponding to the next frame at an end of the current individual added period.

10. The control device according to claim 1, wherein the display panel is a liquid crystal display (LCD), the light emission period is a period in which a backlight is on in a backlight scan, and the light extinction period is a period in which the backlight is off.

11. The control device according to claim 1, wherein a pixel constituting the display panel is a light emitting element that includes an organic electroluminescent (EL) element and emits light by current-driving.

12. A display apparatus comprising:
the control device according to claim 1; and
the display panel that includes:
a gate driving circuit to which a control signal is input from the control device; and
a source driving circuit to which a video signal is input from the control device.

13. The control device according to claim 1, wherein each of the one or more individual added periods includes the light emission period being continuous with the light extinction period.

14. A control method for use for a display panel in which a frame period in which a same image continues to be displayed varies from frame to frame within a certain range or the frame period is temporarily stable between frames, and in which a precise frame period is undetermined beforehand, the control method comprising:
controlling the display panel such that, when a frame having a length exceeding a preset number of lines is input, the display panel displays an image over a first frame period corresponding to the preset number of lines and an added period added after the first frame period, wherein
the added period includes one or more individual added periods each including a light emission period and a light extinction period,
the one or more individual added periods are each an individual period corresponding to a predetermined number of lines, and
the added period includes plural individual added periods, each including a light emission period and a light extinction period.

15. A control device for a display panel for applications where a frame period, in which a same image continues to be displayed, varies from frame to frame within a certain range or the frame period is temporarily stable across frames, and where a precise frame period is undetermined beforehand, wherein
the control device controls the display panel such that, when a frame having a length exceeding a preset number of lines is input, the display panel displays an image over a first frame period corresponding to the preset number of lines and an added period added after the first frame period,
the added period includes one or more individual added periods each including a light emission period and a light extinction period,
the one or more individual added periods are each an individual period corresponding to a predetermined number of lines, and
the control device controls a length of the light extinction period in each of the one or more individual added periods such that a ratio between a length of the light emission period and a length of the light extinction period in each of the one or more individual added periods of the first frame matches a ratio between a length of a light emission period and a length of a light extinction period in the first frame period.

* * * * *